(12) United States Patent
Kudoh et al.

(10) Patent No.: US 6,399,227 B1
(45) Date of Patent: *Jun. 4, 2002

(54) MAGNETO-OPTICAL RECORDING MEDIUM

(75) Inventors: Yoshihiko Kudoh, Yawata; Yasumori Hino, Hirakata; Yuuichi Fukamachi, Ikoma; Masahiro Birukawa, Hirakata, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/160,976

(22) Filed: Nov. 30, 1993

(30) Foreign Application Priority Data

Dec. 1, 1992 (JP) ............................................. 4-321613

(51) Int. Cl.[7] ..................... B32B 15/18; B32B 15/00; G11B 11/00
(52) U.S. Cl. ............................ 428/694 ML; 369/13; 428/694 MM
(58) Field of Search ................. 428/694 ML, 694 MM, 428/694 EC, 900; 369/13

(56) References Cited

U.S. PATENT DOCUMENTS 4,573,149 A * 2/1986 Deguchi et al. ............... 369/13

(List continued on next page.)

FOREIGN PATENT DOCUMENTS

| EP | 258978 | * | 3/1988 |
| EP | 509836 | * | 10/1992 |
| JP | 1128245 | | 5/1989 |
| JP | 1256051 | | 10/1989 |
| JP | 334139 | | 2/1991 |
| JP | 393058 | | 4/1991 |
| WO | 9115013 | | 10/1991 |

OTHER PUBLICATIONS

Saito et al, Proc. Int. Symp. on Optical Memory, Japanese Journal of Applied Physics, vol. 26, Supp. 26 4, pp. 155 159, 1987, "Direct Overwrite by Light Power Modulation on Magneto–Optical Multi–Layered Media." (No Month).

Ohta et al, Proceedings of Magneto–Optical Recording International Symposium '91, J. Magn. Soc. Jpn., vol. 15, Suppl. No. S1, pp. 319–322, 1991, "Read Out Mechanism of Magnetically Induced Super Resolution." (No Month).

*Primary Examiner*—Deborah Jones
*Assistant Examiner*—Michael LaVilla
(74) *Attorney, Agent, or Firm*—Renner, Otto, Boiselle & Sklar, LLP

(57) ABSTRACT

A magneto-optical recording medium including a recording layer for recording information and a substrate for supporting the recording layer is disclosed. The recording layer includes: a recording magnetic film for recording the information, the recording magnetic film being formed of a perpendicular magnetic anisotropy film; a readout magnetic film for optically reading out the information, the readout magnetic film being capable of being magnetically coupled with the recording magnetic film by an exchange-coupling force; and a controlling magnetic film, provided between the recording magnetic film and the readout magnetic film, for controlling the exchange-coupling force. The controlling magnetic film has in-plane magnetic anisotropy at room temperature, thereby suppressing the exchange-coupling force between the recording magnetic film and the readout magnetic film, and when the temperature of the controlling magnetic film reaches a predetermined temperature by a readout light irradiation, the controlling magnetic film stops the suppression of the exchange-coupling force, whereby the information recorded in the recording magnetic film is magnetically transferred to the readout magnetic film.

4 Claims, 7 Drawing Sheets

U.S. PATENT DOCUMENTS

| | | | |
|---|---|---|---|
| 5,018,119 A | * 5/1991 | Aratani et al. | 369/13 |
| 5,087,532 A | 2/1992 | Challener | 428/694 |
| 5,142,513 A | 8/1992 | Takehara et al. | 369/13 |
| 5,164,926 A | 11/1992 | Matsumoto | 369/13 |
| 5,168,482 A | * 12/1992 | Aratani et al. | 369/13 |
| 5,175,714 A | 12/1992 | Kikitsu et al. | 369/13 |
| 5,187,694 A | 2/1993 | Ichilara et al. | 369/13 |
| 5,204,193 A | * 4/1993 | Sato et al. | 428/694 ML |
| 5,208,797 A | 5/1993 | Nakaki et al. | 369/100 |
| 5,224,080 A | 6/1993 | Ohtsuki | 369/13 |
| 5,265,074 A | * 11/1993 | Ohta et al. | 369/13 |
| 5,278,810 A | * 1/1994 | Takahashi et al. | 369/13 |
| 5,317,555 A | * 5/1994 | Takahashi | 369/110 |
| 5,420,833 A | * 5/1995 | Tanaka et al. | 369/13 |
| 5,428,585 A | * 6/1995 | Hirokane et al. | 369/13 |
| 5,450,382 A | * 9/1995 | Shiratori | 369/13 |
| 5,452,272 A | * 9/1995 | Murakami et al. | 369/13 |
| 5,547,773 A | * 8/1996 | Miyakoshi | 428/694 ML |
| 5,616,428 A | * 4/1997 | Nishimura | 428/694 ML |

* cited by examiner

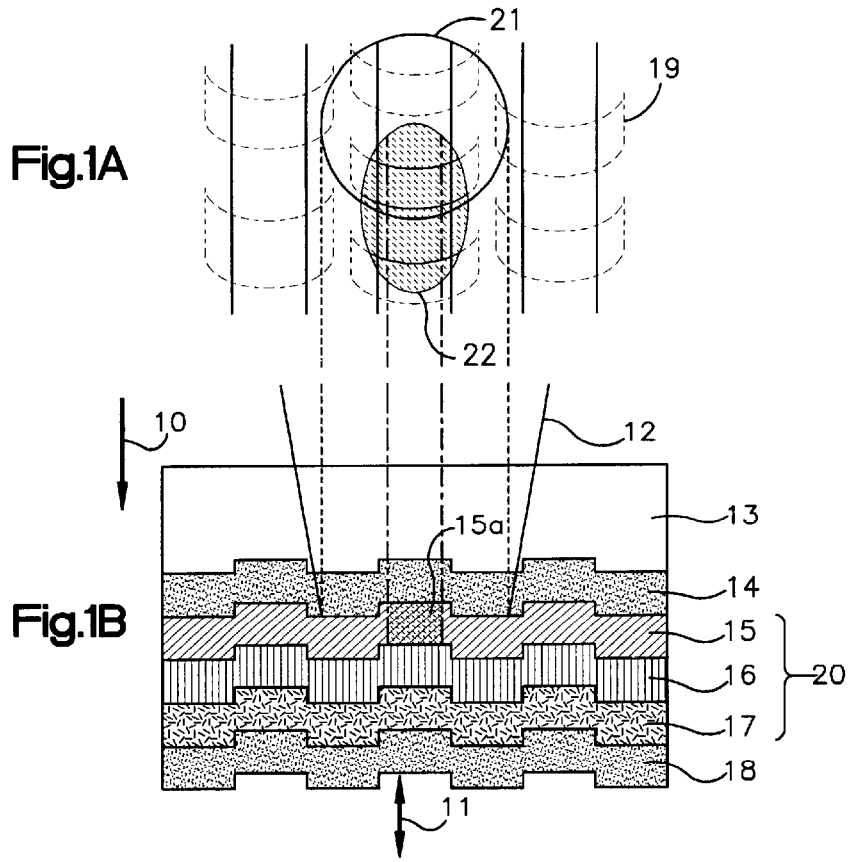
Fig.1A
Fig.1B
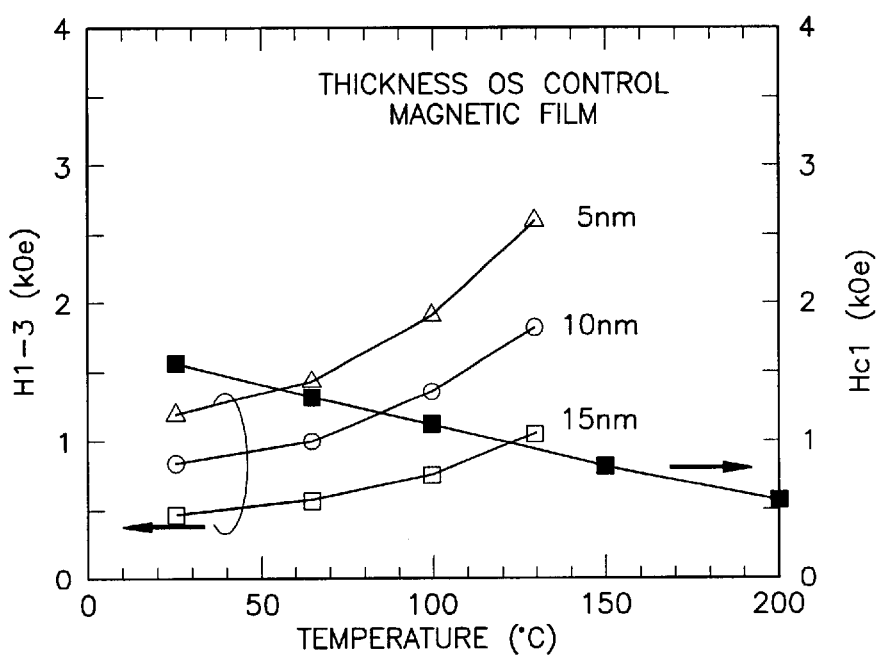
Fig.2

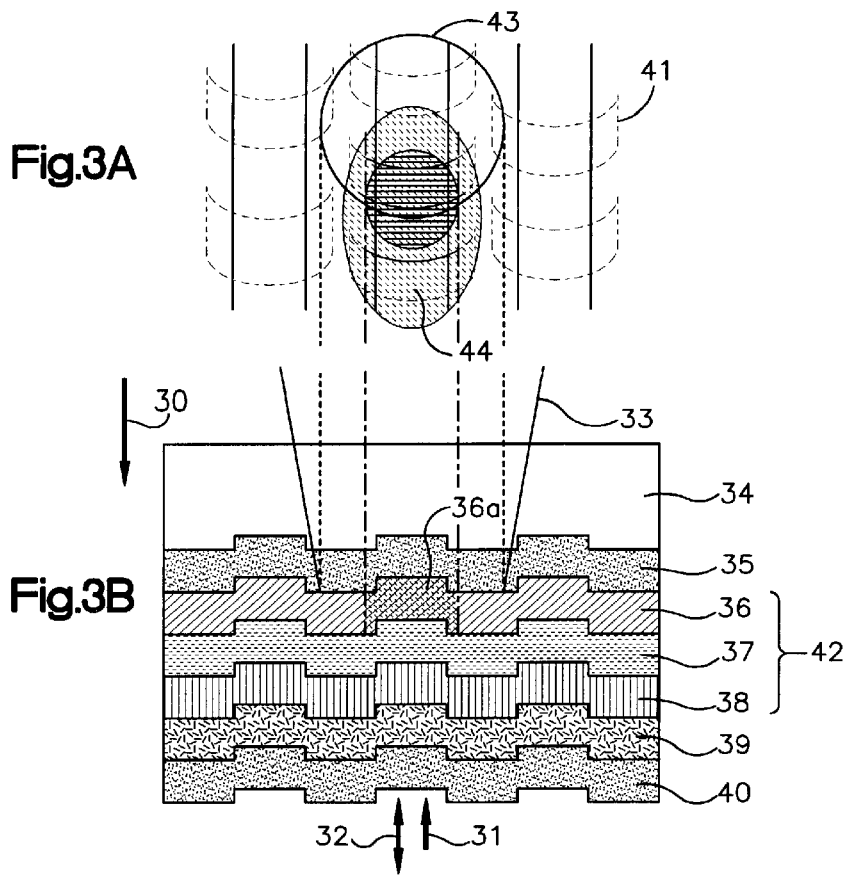
Fig.3A
Fig.3B
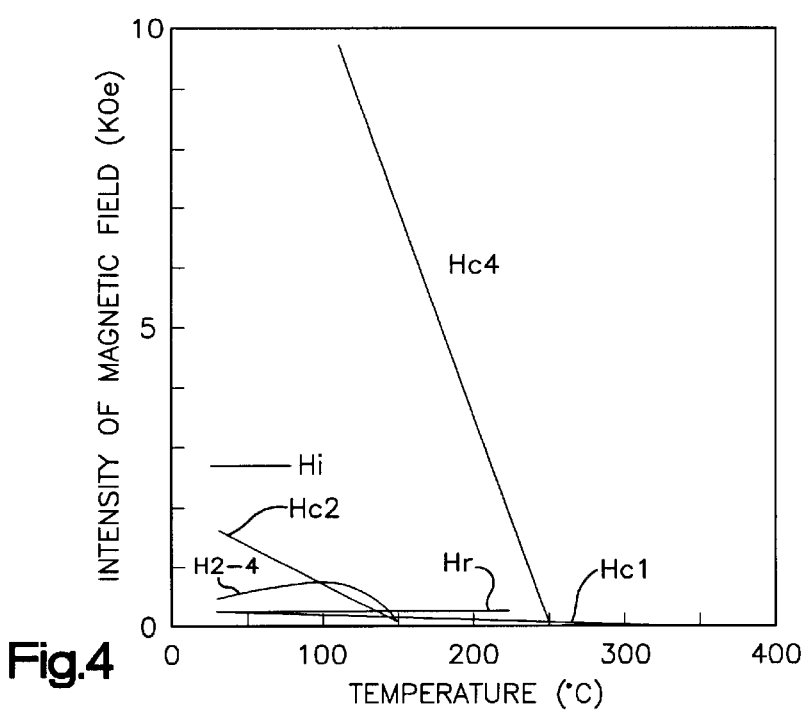
Fig.4

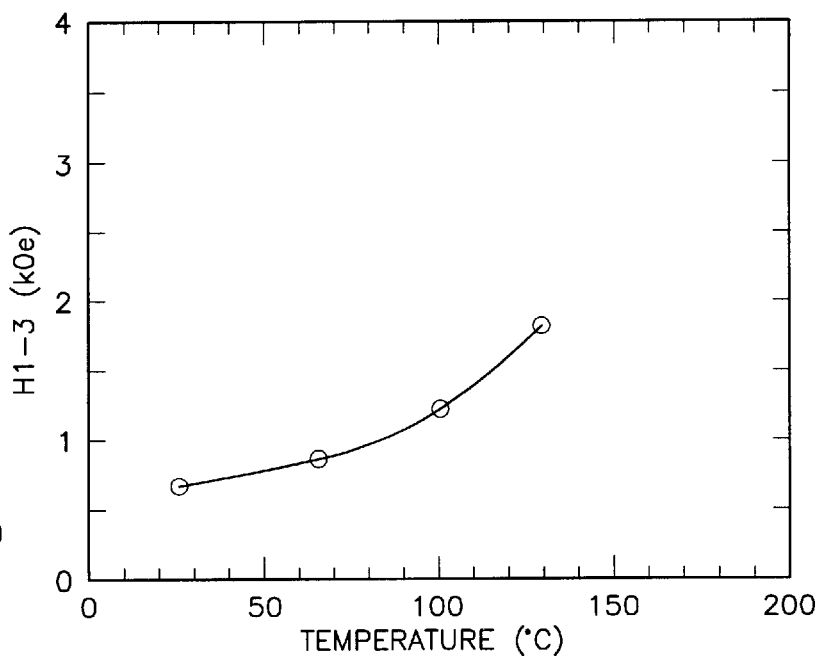
Fig.9
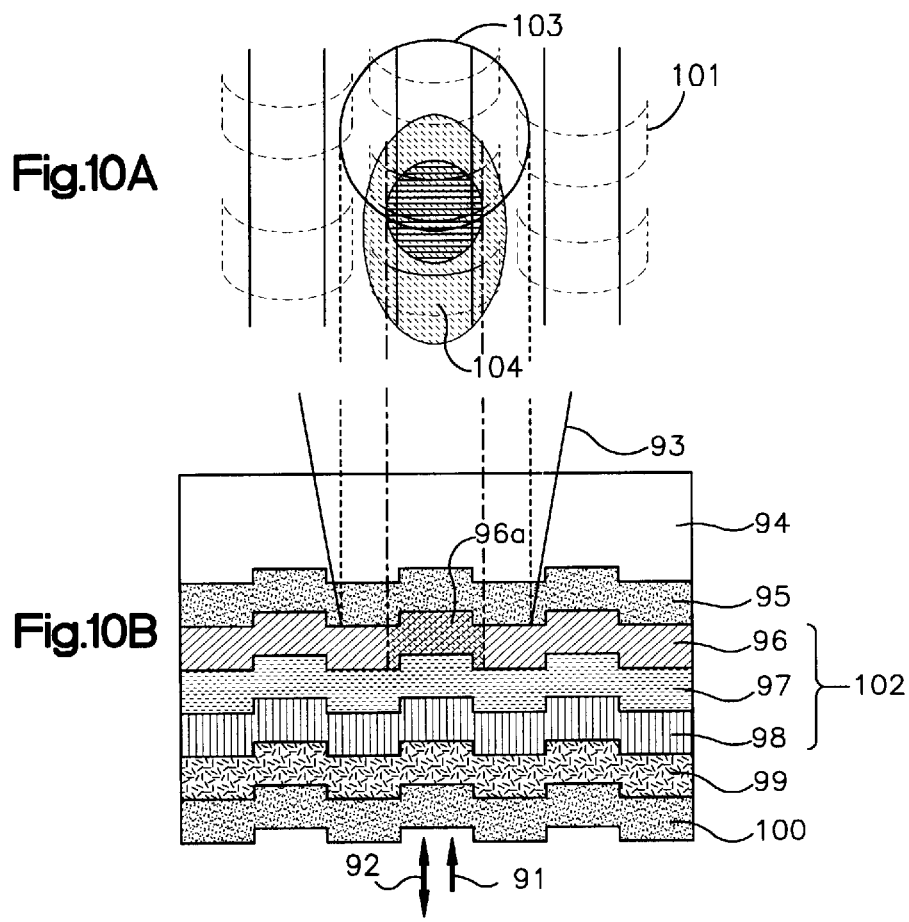
Fig.10A
Fig.10B

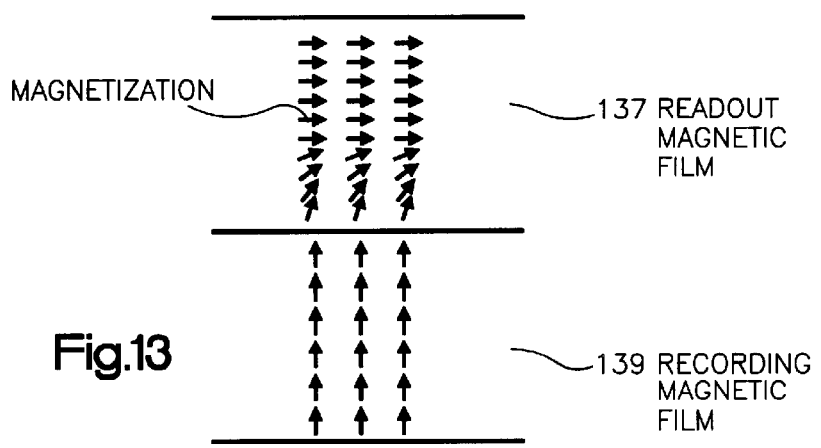
Fig.13
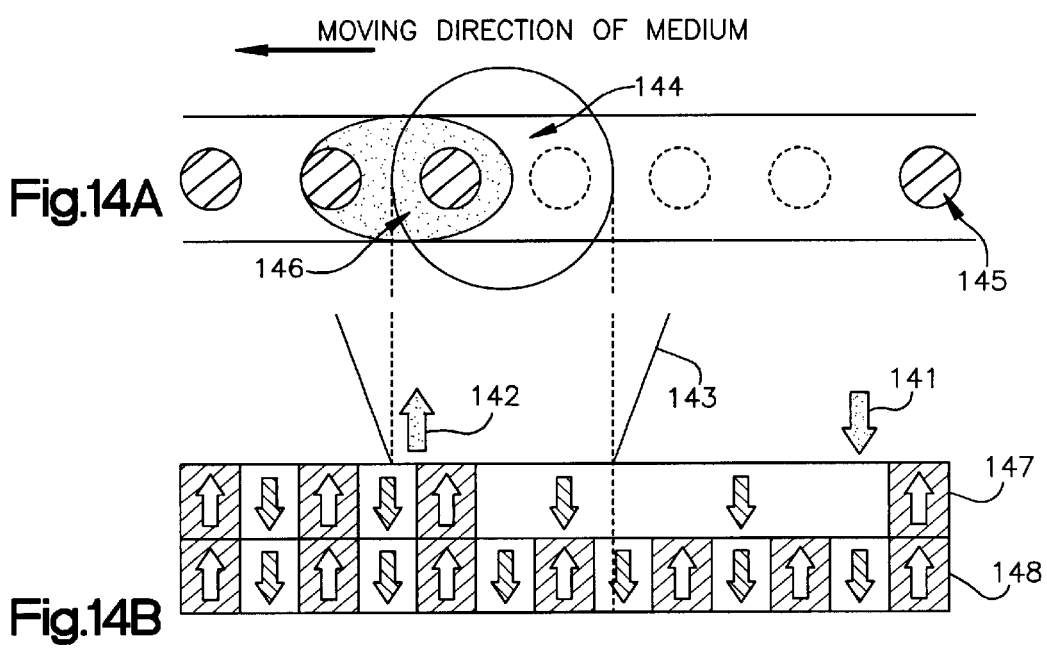
Fig.14A
Fig.14B
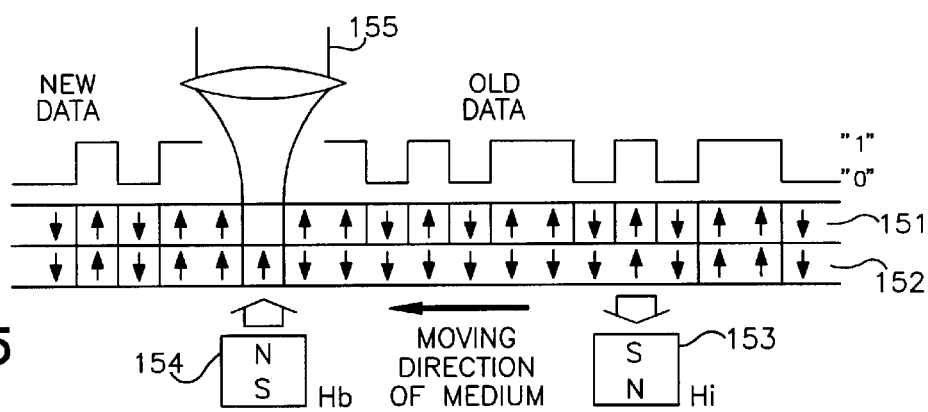
Fig.15

MAGNETO-OPTICAL RECORDING MEDIUM

BACKGROUND OF THE INVENTION

1. Field of the Invention

The present invention relates to a magneto-optical recording medium, and more particularly to a magneto-optical recording medium in which data is recorded and erased using the increase in temperature of a recording layer due to heating by a laser beam and data is optically read out using a magneto-optical effect.

2. Description of the Related Art

Data is recorded in an magneto-optical recording medium by thermal magnetic recording. More specifically, a laser beam is irradiated onto a recording layer in the magneto-optical recording medium; as a result, the recording layer is locally heated to a Curie temperature or more. The irradiated region of the recording layer is magnetized in the direction of an external magnetic field to form a recorded magnetic domain. On the other hand, data is read out using a magneto-optical effect. That is, a weak laser beam is irradiated onto the recording layer. In this case, the power of the laser beam is so low to such a degree that data cannot be recorded and erased. Then, a polarization plane of light reflected from or transmitted through the recording layer is rotated in accordance with the recorded state (i.e., the direction of magnetization of the recorded magnetic domain) thereof. The data is read out by detecting this rotation.

As for a conventional thermal magnetic recording method, there are two methods: a magnetic field modulation recording method and a laser power modulation recording method. According to the magnetic field modulation recording method, a laser beam with a predetermined intensity is irradiated onto a recording layer to increase the temperature thereof, and the direction of an external magnetic field is modulated in accordance with a signal to be recorded. According to the laser power modulation recording method, a laser beam with its intensity modulated in accordance with a signal to be recorded is irradiated to the recording layer under the external magnetic field with a predetermined intensity. In particular, in order to increase the linear recording density in the longitudinal direction of a recording track, the magnetic field modulation recording method is excellent. The reason for this is that the length of the recorded magnetic domain is not limited to a spot size of a laser beam in the magnetic field modulation recording method.

Hereinafter, a conventionally proposed method for overwriting data by the laser power modulation recording method will be described.

FIG. 15 is a schematic cross-sectional view showing a magneto-optical recording medium. As shown in this figure, a recording layer includes a recording/readout magnetic film 151 and a supporting magnetic film 152. The recording/readout magnetic film 151 is a perpendicular magnetic anisotropy film which has a high coercivity $H_{c1}$ and a low Curie temperature $T_{c1}$. The supporting magnetic film 152 is a perpendicular magnetic anisotropy film which has a low coercivity $H_{c2}$ and a high Curie temperature $T_{c2}$. These films are exchange-coupled with each other. Data is recorded in the recording layer by thermal magnetic recording, using an initializing magnetic field ($H_i$) 153 and a recording magnetic field ($H_b$) 154 which generate magnetic fields opposite to each other, and a laser beam 155 whose intensity is modulated in accordance with a signal to be recorded (e.g., J. Saito et al., Proc. Int. Symp. on Optical Memory, 1987, JPN, J. Appl. Phys., Vol. 26, Supplement 26-4 (1987), p. 155).

The recording/readout magnetic film 151 is for recording and reading out data, and the supporting magnetic film 152 is for assisting the recording of data into the recording/readout magnetic film 151. These films are exchange-coupled with each other by a exchange-coupling force $H_{1-2}$ ($H_{2-1}$) therebetween. Suppose that the magnitude of magnetization of the according/readout magnetic film 151 and that of the supporting magnetic film 152 are $M_1$ and $M_2$, the thicknesses thereof are $t_1$, and $t_2$, and energy of a domain wall therebetween, if any, is σw, the exchange-coupling force $H_{1-2}$ seen from the recording/readout magnetic film 151 is represented by the following equation:

$$H_{1-2} = \sigma w / 2 M_1 t_1$$

and the exchange-coupling force H2-1 seen from the supporting magnetic film 152 is represented by the following equation:

$$H_{2-1} = \sigma w / 2 M_2 t_2$$

At room temperature, the following relationships are obtained: $H_{c1} > H_{1-2}$, $H_{c2} > H_{2-1}$, and $H_{c2} + H_{2-1} < H_i < H_{c1}$, and the magnetization direction of the supporting magnetic film 152 is aligned with a direction of the initializing magnetic field ($H_i$) 153.

Recording data in the magneto-optical recording medium with the above-mentioned structure will be described, in which a laser beam with a low-level intensity and a laser beam with a high-level intensity are used. In the case of using a laser beam at a low level, when irradiated with the laser beam, the temperature of the recording layer reaches the vicinity of the Curie temperature $T_{c1}$ of the recording/readout magnetic film 151 and the coercivity $H_{c1}$ thereof is lower than $H_{1-2}$. Thus, the magnetization direction of the supporting magnetic film 152 (i.e., the direction of $H_i$) in the vicinity of the Curie temperature $T_{c1}$ is transferred to the recording/readout magnetic film 151 by the exchange-coupling force $H_{1-2}$. In the case of using a laser beam at a high level, when being irradiated with the laser beam, the temperature of the recording layer reaches the vicinity of the Curie temperature $T_{c2}$ of the supporting magnetic film 152. Thus, the magnetization direction of the supporting magnetic film 152 is aligned with the direction of the recording magnetic field 154 ($H_b$). Thereafter, in the course of cooling step, the magnetization direction of the supporting magnetic film 152 is transferred to the recording/readout magnetic film 151 by the exchange-coupling force $H_{1-2}$.

As described above, data can be overwritten in the magneto-optical recording medium by these two operations.

In the conventional magneto-optical recording medium, when the length of a recorded magnetic domain to be read out becomes less than the spot size of a readout light, recorded magnetic domains adjacent to the recorded magnetic domain to be read out are within the range of the readout light. Consequently, readout signals based on these adjacent recorded magnetic domains are detected together with a readout signal based on the recorded magnetic domain to be read out. Therefore, an S/N ratio is decreased due to the signal interference of the readout signals.

In view of the above problem, a magneto-optical recording medium having a super resolution effect has been proposed (M. Ohta et al., Proceeding of Magneto-optical Recording International Symposium '91, J. Magn. Soc. JPN., Vol. 15, Supplement No. S1 (1991), p. 319). According to the super resolution effect, the spot size of readout light apparently becomes smaller. Readout of data by using this effect is called readout by magnetically induced super resolution. An exemplary structure of a magneto-optical recording medium for super resolution readout will be described with reference to FIGS. 14A and 14B.

FIG. 14A is a top plan view of the magneto-optical recording medium, and FIG. 14B is a cross-sectional view thereof. In these figures, the reference numeral 141 denotes an initializing magnetic field $H_i$, 142 a recording magnetic field $H_r$, 143 readout light, 144 a readout light spot, 145 a recorded magnetic domain, 146 a region at a temperature of $T_d$ or more, 147 a readout magnetic film made of a perpendicular magnetic anisotropy film with a low coercivity $H_{c1}$, 148 a recording magnetic film made of a perpendicular magnetic anisotropy film with a high coercivity $H_{c2}$. The readout magnetic film 147 and the recording magnetic film 148 are exchange-coupled with each other by a exchange-coupling force $H_{1-2}$ ($H_{2-1}$) to form a recording layer.

At room temperature, the coercivity $H_{c1}$ of the readout magnetic film 147 is set to be greater than the exchange-coupling force $H_{1-2}$. In addition, at room temperature, the following relationships: $H_{c1}+H_{1-2}<H_i<H_{c2}$ and $H_{c2}>H_{2-1}$ are obtained. Data is recorded by thermal magnetic recording in the recording magnetic film 148 as the recorded magnetic domain 145 under the recording magnetic field 142. Since the relationships: $H_{c1}>H_{1-2}$, $H_{c2}>H_{2-1}$ and $H_{c1}+H_{1-2}<H_i<H_{c2}$ are obtained at room temperature, the magnetization direction of the readout magnetic film 147 is aligned with the direction of the initializing magnetic field 141, and the recorded magnetic domain 145 is not present in the readout magnetic film 147.

When the temperature of the region 146 of the readout magnetic film 147 is increased to a predetermined temperature $T_d$ or more by the irradiation of readout light during reading out data and the coercivity $H_{c1}$ becomes smaller than the exchange-coupling force $H_{1-2}$, the magnetization direction of the region 146 is aligned with that of the recording magnetic film 148 by the exchange-coupling force $H_{1-2}$. Therefore, the recorded magnetic domain 145 of the recording magnetic film 148 is transferred to the readout magnetic film 147. Thus, recorded data can be read out as a readout signal only from a portion at a temperature of $T_d$ or more of the readout light spot. That is, data can be read out from a recorded magnetic domain with a length less than the readout light spot without any signal interference by adjacent recorded magnetic domains.

The common structure of the above-mentioned two types of magneto-optical recording media (i.e., the magneto-optical recording medium for laser power modulation overwrite and the magneto-optical recording medium for super resolution readout) it as follows:

The recording layer is constituted by two or more magnetic films which are exchange-coupled with each other. At room temperature, the magnetization direction of one of the magnetic films is aligned in one direction (initializing operation). When the temperature goes up, the magnetization direction of the other one of the magnetic films is transferred to one of the magnetic films by the exchange-coupling force (transfer operation).

The above-mentioned magneto-optical recording media have disadvantages. That is, a strong magnetic field (i.e., 3 kOe or more) is required for the initializing magnetic field for the initializing operation, causing an enlarged player. In addition, it is difficult to select and combine the temperature dependence of the coercivity of each magnetic film and the domain wall energy therebetween, which enable satisfactory initializing and transfer operations. More specifically, the selection and combination of a composition of each magnetic film are difficult to realize. Moreover, in the case where a ferrimagnetic film having a compensation temperature of not less than room temperature is used for either one of the magnetic films, it becomes difficult to record data in a recording magnetic film.

SUMMARY OF THE INVENTION

The magneto-optical recording medium of this invention includes recording means for recording information and a substrate for supporting the recording means, wherein the recording means includes: a recording magnetic film for recording the information, the recording magnetic film being formed of a perpendicular magnetic anisotropy film; a readout magnetic film for optically reading out the information, the readout magnetic film being capable of being magnetically coupled with the recording magnetic film by an exchange-coupling force; and a controlling magnetic film, provided between the recording magnetic film and the readout magnetic film, for controlling the exchange-coupling force, and wherein the controlling magnetic film has in-plane magnetic anisotropy at room temperature, thereby suppressing the exchange-coupling force between the recording magnetic film and the readout magnetic film, and when the temperature of the controlling magnetic film reaches a predetermined temperature by a readout light irradiation, the controlling magnetic film stops the suppression of the exchange-coupling force, whereby the information recorded in the recording magnetic film is magnetically transferred to the readout magnetic film.

According to another aspect of the invention, a magneto-optical recording medium includes recording means for recording information and a substrate for supporting the recording means, wherein the recording means includes: a recording magnetic film for recording the information, the recording magnetic film being formed of a perpendicular magnetic anisotropy film; and a readout magnetic film for optically reading out the information, the readout magnetic film being capable of being magnetically coupled with the recording magnetic film by an exchange-coupling force; wherein the readout magnetic film has in-plane magnetic anisotropy at room temperature, and when the temperature of the readout magnetic film reaches a predetermined temperature by a readout light irradiation, the readout magnetic film is a perpendicular magnetic anisotropy film.

According to another aspect of the invention, a magneto-optical recording medium includes recording means for recording information and a substrate for supporting the recording means, wherein the recording means includes: a recording magnetic film for recording the information, the recording magnetic film being formed of a perpendicular magnetic anisotropy film; a readout magnetic film for optically reading out the information, the readout magnetic film being capable of being magnetically coupled with the recording magnetic film by an exchange-coupling force; and a controlling magnetic film, provided between the recording magnetic film and the readout magnetic film, for controlling the exchange-coupling force, and wherein the readout magnetic film has in-plane magnetic anisotropy at room temperature, and is a perpendicular magnetic anisotropy film when the temperature of the readout magnetic film is increased to a predetermined temperature by a readout light irradiation, wherein the controlling magnetic film has a compensation temperature which is substantially equal to the predetermined temperature and a Curie temperature which is set in the range from the predetermined temperature to a temperature lower than the highest temperature which the controlling magnetic film can reach by a readout light irradiation, whereby the information recorded in the recording magnetic film is magnetically transferred to the readout magnetic film via a region having a temperature in the range of the predetermined temperature to the Curie temperature.

According to another aspect of the invention, a magneto-optical recording medium includes recording means for recording information and a substrate for supporting the recording means, wherein the recording means includes: a recording magnetic film for recording the information, the recording magnetic film being formed of a perpendicular magnetic anisotropy film; a readout magnetic film for optically reading out the information, the readout magnetic film being capable of being magnetically coupled with the recording magnetic film by an exchange-coupling force; a controlling magnetic film, provided between the recording magnetic film and the readout magnetic film, for controlling the exchange-coupling force; and a switching magnetic film for breaking the exchange-coupling force between the recording magnetic film and the readout magnetic film at a temperature higher than a predetermined temperature, the switching magnetic film being provided between the recording magnetic film and the readout magnetic film, wherein the controlling magnetic film is a ferrimagnetic film having in-plane magnetic anisotropy at room temperature, thereby suppressing the exchange-coupling force between the recording magnetic film and the readout magnetic film at room temperature, and when the temperature of the controlling magnetic film reaches the predetermined temperature by a readout light irradiation, the controlling magnetic film stops the suppression of the exchange-coupling force, whereby the information recorded in the recording magnetic film is magnetically transferred to the readout magnetic film, wherein the switching magnetic film has a Curie temperature which is set to be a temperature lower than the highest temperature which the switching magnetic film can reach by the readout light irradiation, whereby the information recorded in the recording magnetic film is magnetically transferred to the readout magnetic film via a region having a temperature in the range of the predetermined temperature to the Curie temperature, and wherein the readout magnetic film has in-plane magnetic anisotropy at room temperature, and is a perpendicular magnetic anisotropy film when the temperature of the readout magnetic film reaches the predetermined temperature by the readout light irradiation.

According to another aspect of the invention, a magneto-optical recording medium includes recording means for recording information and a substrate for supporting the recording means, wherein the recording means includes: a recording magnetic film having a Curie temperature, for recording the information, the recording magnetic film being formed of a perpendicular magnetic anisotropy film; and a readout magnetic film for optically reading out the information, the readout magnetic film being capable of being magnetically coupled with the recording magnetic film by an exchange-coupling force, wherein, just under the Curie temperature of the recording magnetic film, the dominant sub-lattice magnetization type of the recording magnetic film is the same as that of the readout magnetic film.

According to another aspect of the invention, a magneto-optical recording medium includes recording means for recording information and a substrate for supporting the recording means, wherein the recording means includes: a recording magnetic film having a Curie temperature, for recording the information, the recording magnetic film being formed of a perpendicular magnetic anisotropy film; a readout magnetic film for optically reading out the information, the readout magnetic film being capable of being magnetically coupled with the recording magnetic film by an exchange-coupling force; and a controlling magnetic film, provided between the recording magnetic film and the readout magnetic film, for controlling the exchange-coupling force, and wherein, just under the Curie temperature of the recording magnetic film, the dominant sub-lattice magnetization type of the recording magnetic film is the same as those of the readout magnetic film and the controlling magnetic film.

According to another aspect of the invention, a magneto-optical recording medium includes recording means for recording information and a substrate for supporting the recording means, wherein the recording means includes: a recording magnetic film having a Curie temperature, for recording the information, the recording magnetic film being formed of a perpendicular magnetic anisotropy film; a readout magnetic film for optically reading out the information, the readout magnetic film being capable of being magnetically coupled with the recording magnetic film by an exchange-coupling force; a controlling magnetic film, provided between the recording magnetic film and the readout magnetic film, for controlling the exchange-coupling force; and a switching magnetic film for breaking the exchange-coupling force between the recording magnetic film and the readout magnetic film at a temperature higher than a predetermined temperature, the switching magnetic film being provided between the recording magnetic film and the readout magnetic film, the switching magnetic film being a perpendicular magnetic anisotropy film, and wherein, just under the Curie temperature of the recording magnetic film, the dominant sub-lattice magnetization type of the recording magnetic film is the same as that of the controlling magnetic film, and the information recorded in the recording magnetic film is magnetically transferred to the readout magnetic film due to the exchange-coupling force by a readout light irradiation.

According to another aspect of the invention, a magneto-optical recording medium includes recording means for recording information and a substrate for supporting the recording means, wherein the recording means includes: a recording/readout magnetic film for recording the information and for optically reading out the information, the recording/readout magnetic film being formed of a perpendicular magnetic anisotropy film; a supporting magnetic film capable of being magnetically coupled with the recording/readout magnetic film by an exchange-coupling force; and a controlling magnetic film, provided between the recording/readout magnetic film and the supporting magnetic film, for controlling the exchange-coupling force, and wherein the controlling magnetic film has in-plane magnetic anisotropy at room temperature, thereby suppressing the exchange-coupling force between the recording/readout magnetic film and the supporting magnetic film, and when the temperature of the controlling magnetic film reaches a predetermined temperature by a recording light irradiation, the controlling magnetic film stops the suppression of the exchange-coupling force, whereby the magnetization direction of the supporting magnetic film is magnetically transferred to the recording/readout magnetic film.

According to another aspect of the invention, a magneto-optical recording medium includes recording means for recording information and a substrate for supporting the recording means, wherein the recording means includes: a recording/readout magnetic film for recording the information and for optically reading out the information, the recording/readout magnetic film being formed of a perpendicular magnetic anisotropy film; a supporting magnetic film capable of being magnetically coupled with the recording/ readout magnetic film by an exchange-coupling force, the supporting magnetic film having a Curie temperature; and a controlling magnetic film, provided between the recording/readout magnetic film and the supporting magnetic film, for controlling the exchange-coupling force, and wherein, just under the Curie temperature of the supporting magnetic film, the dominant sub-lattice magnetization type of the supporting magnetic film is the same as that of the controlling magnetic film.

According to another aspect of the invention, a magneto-optical recording medium includes recording means for recording information and a substrate for supporting the recording means, wherein the recording means includes: a recording magnetic film for recording the information, the recording magnetic film being formed of a perpendicular magnetic anisotropy film; a readout magnetic film for optically reading out the information, the readout magnetic film being capable of being magnetically coupled with the recording magnetic film by an exchange-coupling force; a controlling magnetic film provided on the recording magnetic film; and a supporting magnetic film provided on the controlling magnetic film, wherein, when the temperature is increased by a recording light irradiation, a first transfer operation in which the magnetization direction is transferred from the supporting magnetic film to the recording magnetic film via the controlling magnetic film is performed, and when the temperature is increased by a readout light irradiation, a second transfer operation in which the magnetization direction is transferred from the recording magnetic film to the readout magnetic film is performed, wherein the controlling magnetic film is a film for controlling an exchange-coupling force between the recording magnetic film and the supporting magnetic film, and the controlling magnetic film is a ferrimagnetic film which has in-plane magnetic anisotropy at room temperature and has a compensation temperature which is substantially equal to a temperature at which the first transfer operation is performed, and wherein the readout magnetic film has in-plane magnetic anisotropy at room temperature and is a perpendicular magnetic anisotropy film at a temperature at which the second transfer operation is performed.

According to another aspect of the invention, a magneto-optical recording medium includes recording means for recording information and a substrate for supporting the recording means, wherein the recording means includes: a recording magnetic film for recording the information, the recording magnetic film being formed of a perpendicular magnetic anisotropy film; a readout magnetic film for optically reading out the information, the readout magnetic film being capable of being magnetically coupled with the recording magnetic film by an exchange-coupling force; a controlling magnetic film provided on the recording magnetic film; and a supporting magnetic film provided on the controlling magnetic film, the supporting magnetic film having a Curie temperature, wherein, when the temperature is increased by a recording light irradiation, a first transfer operation in which the magnetization direction is transferred from the supporting magnetic film to the recording magnetic film via the controlling magnetic film is performed, and when the temperature is increased by a readout light irradiation, a second transfer operation in which the magnetization direction is transferred from the recording magnetic film to the readout magnetic film is performed, wherein, just under the Curie temperature of the supporting magnetic film, the dominant sub-lattice magnetization type of the supporting magnetic film is the same as that of the controlling magnetic film.

Thus, the invention described herein makes possible the advantage of providing a magneto-optical recording medium in which an initializing magnetic field for an initializing operation is decreased or made unnecessary, the composition of each magnetic film for satisfactory performing initializing and transfer operations can be selected from a wide range, and reliable recording operations are performed even in the case where a recording film includes two or more magnetic films.

This and other advantages of the present invention will become apparent to those skilled in the art upon reading and understanding the following detailed description with reference to the accompanying figures.

BRIEF DESCRIPTION OF THE DRAWINGS

FIG. 1A is a top plan view showing a magneto-optical recording medium of a first example according to the present invention.

FIG. 1B is a cross-sectional view showing the magneto-optical recording medium of the first example according to the present invention.

FIG. 2 is a graph showing the relationship between the exchange-coupling force $H_{1-3}$ and the temperature.

FIG. 3A is a top plan view showing a magneto-optical recording medium of a second example according to the present invention.

FIG. 3B is a cross-sectional view showing the magneto-optical recording medium of the second example according to the present invention.

FIG. 4 is a graph showing the relationship between the intensity of a magnetic field and the temperature.

FIG. 9 is a graph showing the relationship between the exchange-coupling force $H_{1-3}$ and the temperature.

FIG. 10A is a top plan view showing a magneto-optical recording medium of a fourth example according to the present invention.

FIG. 10B is a cross-sectional view showing the magneto-optical recording medium of the fourth example according to the present invention.

FIG. 13 is a view schematically showing the magnetization state of a readout magnetic film at room temperature according to one embodiment of the present invention.

FIG. 14A is a top plan view showing a conventional magneto-optical recording medium.

FIG. 14B is a cross-sectional view showing the conventional magneto-optical recording medium.

FIG. 15 is a cross-sectional view showing another conventional magneto-optical recording medium.

DESCRIPTION OF THE PREFERRED EMBODIMENTS

Figure 12A:
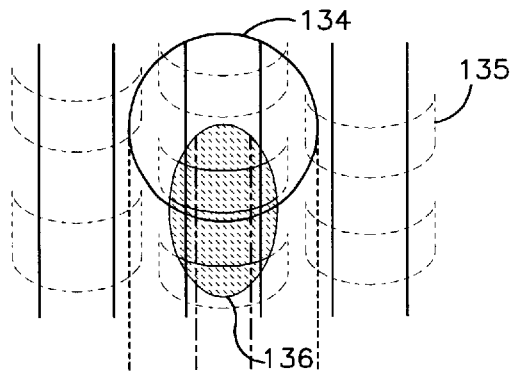
FIG. 12A is a top plan view illustrating the function of the magneto-optical recording medium according to the present invention.
Figure 12B:
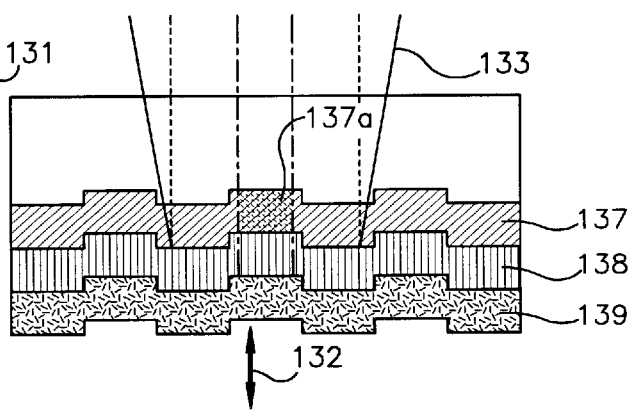
FIG. 12B is a cross-sectional view illustrating the function of the magneto-optical recording medium according to the present invention.

Prior to the description of specific examples, the function of the magneto-optical recording medium of the present invention will be described with reference to FIGS. 12A and 12B. FIG. 12A is a top plan view of the magneto-optical recording medium, and FIG. 12B is a cross-sectional view thereof. In this magneto-optical recording medium, a controlling magnetic film 138 is provided between a readout magnetic film 137 and a recording magnetic film 139. The controlling magnetic film 138 controls the exchange-coupling force between the readout magnetic film 137 and the recording magnetic film 139. At room temperature, the controlling magnetic film 138 is an in-plane magnetic anisotropy film and its compensation temperature is set in the vicinity of $T_d$ at which the transfer operation is performed (i.e., the controlling magnetic film 138 is a ferrimagnetic film). In FIGS. 12A and 12B, the reference numeral 131 denotes an initializing magnetic field $H_i$, 132 a recording magnetic field, 133 readout light, 134 a readout light spot, 135 a recorded magnetic domain, and 136 a region at $T_d$ or more. The readout magnetic film 137 is a perpendicular magnetic anisotropy film with a low coercivity $H_{c1}$, and the recording magnetic film 139 is a perpendicular magnetic anisotropy film with a high coercivity of $H_{c3}$.

The controlling magnetic film 138 has an axis direction, which is likely to be magnetized, different from those of the readout magnetic film 137 and the recording magnetic film 139. Because of this, the controlling magnetic film 138 weakens an exchange-coupling force $H_{1-3}$ from the recording magnetic film 139 to the readout magnetic film 137 at room temperature. A demagnetizing field $4\pi M_s$ causes in-plane magnetic anisotropy in a magnetic thin film with a saturated magnetization $M_s$, so that when the saturated magnetization $M_s$ comes close to 0, the in-plane magnetic anisotropy also comes close to 0. The exchange-coupling generates based on the property that the directions of the sub-lattice magnetization in the readout magnetic film 137 and the recording magnetic film 139 are likely to be in parallel with each other or are likely to be in antiparallel with each other. Therefore, when the substantial magnetization is 0, the exchange-coupling force does not generate.

However, the controlling magnetic film 138 can transmit the exchange-coupling force at its compensation temperature at which its $M_s$ is nearly 0. The reason for this is that each sub-lattice magnetization (i.e., substantial magnetization) is not 0 at the compensation temperature at which the directions of sub-lattice magnetization are in antiparallel with each other and the magnitudes of them are equal, even though the saturated magnetization $M_s$ is 0. Thus, when the temperature of the recording layer reaches the vicinity of the compensation temperature of the controlling magnetic film 138, the ability of the controlling magnetic film 138 of weakening the exchange-coupling force $H_{1-3}$ is decreased together with the decrease in the demagnetizing field $4\pi M_s$. On the other hand, the sub-lattice magnetization still exists, so that the ability of the controlling magnetic film 138 of transmitting the exchange-coupling force $H_{1-3}$ is still large. That is, the controlling magnetic film 138 suppresses the exchange-coupling force $H_{1-3}$ at room temperature at which it has a large saturated magnetization, and supports the exchange-coupling force $H_{1-3}$ in the vicinity of $T_d$ at which the transfer operation is performed (i.e., at the compensation temperature at which the saturated magnetization becomes nearly 0).

Data is recorded by thermal magnetic recording in the recording magnetic film 139 as the recorded magnetic domain 135 under the recording magnetic field 132. At room temperature, the exchange-coupling force $H_{1-3}$ is weakened by the controlling magnetic film 138, so that the relationships: $H_{c1} > H_{1-3}$, $H_{c3} > H_{3-1}$ and $H_{c1} + H_{1-3} < H_i < H_{c3}$ can be easily set even though the initializing magnetic field $H_i$ is decreased to 3 kOe or less. Thus, the magnetization direction of the readout magnetic film 137 is aligned with the direction of the initializing magnetic field $H_i$ 131 at room temperature, and the recorded magnetic domain 135 is not present in the readout magnetic film 137.

In the case where the temperature of the region 136 of the readout magnetic film 137 is increased to a predetermined temperature of $T_d$ or more by the irradiation of readout light while data is read out, the temperature of the corresponding portion of the controlling magnetic film 138 reaches the vicinity of its compensation temperature. Consequently, the ability of the controlling magnetic film 138 of weakening the exchange-coupling force $H_{1-3}$ is decreased to increase the exchange-coupling force $H_{1-3}$. Therefore, the relationships: $H_{c1} < H_{1-3}$ and $H_{c3} > H_{3-1}$ can be easily obtained at the predetermined temperature. Thus, the magnetization direction of the region 136 of the readout magnetic film 137 is aligned with the direction of the recording magnetic film 139, so that the recorded magnetic domain 135 of the recording magnetic film 139 is transferred to the readout magnetic film 137.

More specifically, a high-performance magneto-optical recording medium can be realized, in which the initializing magnetic field for the initializing operation is decreased, a composition of each magnetic film for satisfactory performing initializing and transfer operations can be selected from a wide range.

The above-mentioned effect of the present invention can be obtained even in the magneto-optical recording medium for laser power modulation overwrite, if the supporting magnetic film is considered as the recording magnetic film and a ferrimagnetic film is used.

Referring to FIGS. 12A and 12B, the structure, in which a magnetic film which is an in-plane magnetic anisotropy film at room temperature and is a perpendicular magnetic anisotropy film in the vicinity of its compensation temperature $T_{comp1}$ is used as the readout magnetic film 137 and the controlling magnetic film 138 is omitted, will be considered.

The magnetization state of the readout magnetic film 137 in the film thickness direction has more perpendicular component on the side of the recording magnetic film 139 due to the exchange-coupling force $H_{1-3}$. However, if the readout magnetic film 137 has sufficiently large in-plane magnetic anisotropy at room temperature, as shown in FIG. 13, the magnetization of the readout magnetic film 137 on the incident side of the readout light is hardly influenced by the exchange-coupling force $H_{1-3}$ and remains in-plane magnetization. A Kerr effect generates due to the magnetization in the vicinity of the surface of a magnetic film. Thus, when seen from the side of the readout light, the magnetization of the surface of the readout magnetic film 137 is almost directed to the in-plane direction at about room temperature and the polar Kerr rotation angle is nearly 0. Therefore, the recorded magnetic domain cannot be detected on the readout magnetic film 137. In the case where the temperature of the region 136 of the readout magnetic film 137 is increased to the vicinity of $T_{comp1}$ by the irradiation of readout light, the readout magnetic film 137 becomes a perpendicular magnetic anisotropy film having a coercivity $H_{c1}$. At this time, the magnetization of the region 136 of the readout magnetic film 137 in the film thickness direction becomes perpendicular, so that the relationships: $H_{c1}<H_{1-3}$ and $H_{c3}>H_{3-1}$ can be easily obtained. Thus, the magnetization direction of the region 136 of the readout magnetic film 137 is aligned with that of the recording magnetic film 139, and the recorded magnetic domain 135 of the recording magnetic film 139 is transferred to the readout magnetic film 137. In this case, the initializing magnetic field is not required.

More specifically, a high-performance magneto-optical recording medium can be obtained, in which the initializing magnetic field for the initializing operation is not required and a composition of each magnetic film for performing satisfactory initializing and transfer operations can be selected from a wide range.

The exchange-coupling force of the controlling magnetic film 138 influences between the readout magnetic film 137 and the recording magnetic film 139. The controlling magnetic film 138 has sub-lattice magnetization and its exchange-coupling force tries to align the directions of the same kinds of sub-lattice magnetizations in one direction. Thus, in the case where a ferrimagnetic film is used for each of the above-mentioned magnetic films, when the dominant sub-lattice magnetization type of the recording magnetic film 139 is different from those of the readout magnetic film 137 and the controlling magnetic film 138 Just under a Curie temperature $T_{c3}$ of the recording magnetic film 139 (at which temperature, recording is performed), the action of the recording magnetic field 132 with respect to the saturated magnetization direction of each magnetic film is opposite to that of the exchange-coupling force; as a result, the exchange coupling force interferes the recording operation.

If the dominant sub-lattice magnetization of each magnetic film is designed to be the same in the vicinity of the Curie temperature of $T_{c3}$ of the recording magnetic film 139, the recorded magnetic domain 135 is not prevented from being formed on the recording magnetic film 139 by the exchange-coupling force from the readout magnetic film 137 or from the controlling magnetic film 138. Therefore, the recording operation can be easily performed without fail.

The above-mentioned effect of the present invention can be obtained even in the magneto-optical recording medium for laser power modulation overwrite, if the supporting magnetic film is considered as the recording magnetic film and a ferrimagnetic film is used.

In the above-description, the magnetic field modulation recording method in which the recorded magnetic domain is in a crescent shape is described. However, even though the recorded magnetic domain is in a circular shape formed by the laser power modulation recording method, the same effects as those of the present invention can be obtained.

EXAMPLE 1

FIGS. 1A and 1B are a top plan view and a side cross-sectional view, respectively, showing a construction of a magneto-optical (MO) recording medium in the first example according to the invention. This example describes an MO recording medium for super resolution readout in which the recording layer has a triple magnetic-film structure of a readout magnetic film, a controlling magnetic film, and a recording magnetic film which are exchange-coupled.

In FIG. 1B, an arrow 10 indicates a direction of an initializing magnetic field $H_i$ at a position distant from a light spot, an arrow 11 indicates a direction of a recording magnetic field $H_w$, and lines 12 indicate recording light or readout light. Referring to FIGS. 1A and 1B, the MO recording medium in this example includes a substrate 13 made of polycarbonate, protective layers 14 and 18 made of SiN films, a readout magnetic film 15, a controlling magnetic film 16, a recording magnetic film 17, and recorded magnetic domains 19. The readout magnetic film 15 is made of a perpendicular magnetic anisotropy GdTbFeCo film having a Curie temperature $T_{c1}$ and a coercivity $H_{c1}$. The controlling magnetic film 16 is made of a ferrimagnetic GdFeCo film having a Curie temperature $T_{c2}$ which is an in-plane magnetic anisotropy film at room temperature and has a compensation temperature $T_{comp2}$ at about 150° C. The recording magnetic film 17 is made of a perpendicular magnetic anisotropy TbFeCo film having a Curie temperature $T_{c3}$ and a coercivity $H_{c3}$. The readout magnetic film 15 and the recording magnetic film 17 are exchange-coupled via the controlling magnetic film 16, and these three magnetic films constitute a recording layer 20. The respective films on the substrate 13 are formed by a sputtering system or a vacuum evaporation system. The thicknesses of the protective layers 14 and 18 are set to be 80 nm. The thicknesses of the readout magnetic film 15, the controlling magnetic film 16, and the recording magnetic film 17 are set to be 40 nm, 5–15 nm, and 50 nm, respectively. The Curie temperatures $T_{c1}$, $T_{c2}$, and $T_{c3}$ are set to be about 300° C., 300° C. or more, and about 230° C., respectively. The coercivities $H_{c1}$ and $H_{c3}$ are set to be 1.5–2 kOe, and 10–20 kOe at room temperature, respectively.

As to the magnetization of the rare-earth (RE)-transition-metal (TM) ferrimagnetic film having a compensation temperature, a sub-lattice magnetization of a rare-earth metal element is dominant at temperatures lower than the compensation temperature. A sublattice magnetization of a transition metal element is dominant at temperatures higher than the compensation temperature. Therefore, at about the Curie temperature $T_{c3}$ of the recording magnetic film 17 at which the recording is performed, the readout magnetic film 15 and the controlling magnetic film 16 as well as the recording magnetic film 17 are desired to be in a state in which the sub-lattice magnetization of a transition metal element is dominant, in order not to prevent the formation of recorded magnetic domains 19 to the recording magnetic film 17 in the recording magnetic field $H_w$ by the effect of the exchange-coupling force from the readout magnetic film 15 and the controlling magnetic film 16 to the recording magnetic film 17.

Information is thermally and magnetically recorded on the recording magnetic film 17 as the recorded magnetic domains 19 in recording magnetic field $H_w$ (about 100 to 300 Oe) by a magnetic field modulation recording method. At room temperature, due to the exchange-coupling force suppressing effect of the controlling magnetic film 16, the exchange-coupling force $H_{1-3}$ of the recording magnetic film 17 to the readout magnetic film 15 is reduced.

FIG. 2 shows the relationship between a temperature and the exchange-coupling force $H_{1-3}$, and the relationship between a temperature and the coercivity of the readout magnetic film 15 by using the thickness of the controlling magnetic film 16 as a parameter. When the thickness of the controlling magnetic film 16 is 5–15 nm, it is assumed that $H_{1-3}$ is about 0.5–1.1 kOe and $H_{c1}$ is about 1.5 kOe, at room temperature. In this case, even if the initializing field $H_i$ is reduced to 3 kOe or lower, conditions of $H_{c1}>H_{1-3}$, $H_{c3}>H_{3-1}$, and $H_{c1}+H_{1-3}<H_i>H_{c3}$ are easily established. Therefore, the magnetization of the readout magnetic film 15 is aligned with the direction of the initializing magnetic field $H_i$, and there is no recorded magnetic domain 19 in the readout magnetic film 15. In FIG. 1A, for the purpose for showing a state where the recorded magnetic domains 19 recorded on the recording magnetic film 17 do not exist on the readout magnetic film 15, the recorded magnetic domains 19 are indicated by broken lines.

When the information is read out from the MO recording medium, the temperature of the recording layer 20 is increased by the irradiation of the readout light. The intensity of the focused readout light has a Gaussian distribution, and the MO recording medium is moved with respect to the readout light. Accordingly, the temperature distribution in the vicinity of the readout light spot is asymmetrically shifted rearward from the center of the readout light spot 21, as is shown in FIG. 1A. As a result, a high-temperature region 22 whose temperature is equal to or higher than a predetermined temperature is formed.

When the temperature of a part 15a of the readout magnetic film 15 is increased to 130° C. or a higher temperature, i.e., when the temperature of a part 15a is increased to about the compensation temperature (150° C.) of the controlling magnetic film 16, the exchange-coupling force suppressing effect of the controlling magnetic film 16 is reduced. Thus, the exchange-coupling force $H_{1-3}$ is increased to about 1–2.6 kOe, so that the conditions of $H_{c1}<H_{1-3}$, and $H_{c3}>H_{3-1}$ can easily be established. Therefore, the magnetization direction of the part 15a of the readout magnetic film 15 is aligned with the magnetization direction of the recording magnetic film 17. As a result, the recorded magnetic domains 19 of the recording magnetic film 17 are transferred to the readout magnetic film 15.

As described above, the recorded information can be detected as a readout signal from the high-temperature region 22 having a temperature of 130° C. or higher of the readout light spot 21. This means that a recorded magnetic domain having a length smaller than the diameter of the readout light spot can be read out without a signal interference of the recorded magnetic domain positioned forward.

At this time, it is desired that the Curie temperature $T_{c1}$ of the readout magnetic film 15 is set to be equal to or higher than the Curie temperature $T_{c3}$ of the recording magnetic film 17, in order to obtain a Kerr rotation angle sufficient for the relatively high intensity of the readout light, and in order to use the recording temperature as low as possible.

The Curie temperatures and coercivities of the respective magnetic films of the recording layer 20 can relatively easily be changed by the composition selection and the addition of various elements which cause the magnitude of perpendicular magnetic anisotropy to vary.

Therefore, an MO recording medium with high performance can be realized in which the initializing field for the initializing operation is reduced, and the compositions of the respective magnetic films can be variously selected for a good initializing operation and a good transfer operation.

In this example, the substrate 13 is made of polycarbonate, the protective layers 14 and 18 are made of SiN films, the readout magnetic film 15 is made of a GdTbFeCo film, the controlling magnetic film 16 is made of a GdFeCo film, and the recording magnetic film 17 is made of a TbFeCo film. Alternatively, the substrate 13 may be made of another type of plastic or glass. The protective layers 14 and 18 may be made of a nitride film such as AlN, an oxide film such as tantalum oxide, a chalcogenide film such as ZnS, or a film of mixture thereof. The controlling magnetic film 16 may be made of another ferrimagnetic film such as a GdFe film, a GdCo film, a TbFeCo film, or a DyFeCo film which is an in-plane magnetic anisotropy film at room temperature, and has a compensation temperature $T_{comp2}$ around the temperature at which the transfer occurs. Each of the readout magnetic film 15 and the recording magnetic film 17 may be made of another rare-earth-transition-metal perpendicular magnetic anisotropy film, an Mn type perpendicular magnetic anisotropy film, or a perpendicular magnetic anisotropy film of another magnetic material, as far as the conditions of $T_{c1} \geq T_{c3} > T_{comp2}$, $H_{c1}>H_{1-3}$ and $H_{c1}+H_{1-3}<H_i<H_{c3}$ at room temperature, and $H_{c1}<H_{1-3}$ and $H_{c3}>H_{3-1}$ at about $T_{comp2}$ are satisfied.

This example describes a case where the recording is performed by the magnetic field modulation recording method in which the recorded magnetic domain is crescent-shaped. Another case where the recording is performed by a laser power modulation recording method in which the recorded magnetic domain is circular can attain the same effects.

EXAMPLE 2

A magneto-optical (MO) recording medium in the second example according to the invention will be described with reference to relevant figures, FIGS. 3A and 3B are a top plan view and a side cross-sectional view, respectively, showing a construction of the MO recording medium in this example. This example describes an MO recording medium for super resolution readout in which the recording layer has a four magnetic-film structure of a readout magnetic film, a switching magnetic film, a controlling magnetic film, and a recording magnetic film which are exchange-coupled.

In FIG. 3B, an arrow 30 indicates a direction of an initializing magnetic field $H_i$ at a position distant from a light spot, an arrow 31 indicates a direction of a readout magnetic field $H_r$, an arrow 32 indicates a direction of a recording magnetic field $H_w$, and lines 33 indicate recording light or readout light. Referring to FIGS. 3A and 3B, the MO recording medium in this example includes a substrate 34 made of polycarbonate, protective layers 35 and 40 made of ZnS films, a readout magnetic film 36, a switching magnetic film 37, a controlling magnetic film 38, a recording magnetic film 39, and recorded magnetic domains 41. The readout magnetic film 36 is made of a perpendicular magnetic anisotropy GdFeCo film having a Curie temperature $T_{c1}$ and a coercivity $H_{c1}$. The switching magnetic film 37 is made of a perpendicular magnetic anisotropy TbFeCo film having a Curie temperature $T_{c2}$ and a coercivity $H_{c2}$ The controlling magnetic film 38 is made of a ferrimagnetic GdFeCo film having a Curie temperature $T_{c3}$ which is an in-plane magnetic anisotropy film at room temperature and has a compensation temperature $T_{comp3}$ at about 130° C. The recording magnetic film 39 is made of a perpendicular magnetic anisotropy TbFeCo film having a Curie temperature $T_{c4}$ and a coercivity $H_{c4}$. The readout magnetic film 36 and the recording magnetic film 39 are exchange-coupled via the switching magnetic film 37 and the controlling magnetic film 38, and these four magnetic films constitute a recording layer 42. The respective films on the substrate 34 are formed by a sputtering system or a vacuum evaporation system. The thicknesses of the protective layers 35 and 40 are set to be 80 nm. The thicknesses of the readout magnetic film 36, the switching magnetic film 37, the controlling magnetic film 38, and the recording magnetic film 39 are set to be 35 nm, 10 nm, 5–15 nm, and 45 nm, respectively. The Curie temperatures $T_{c1}$, $T_{c2}$, $T_{c3}$, and $T_{c4}$ are set to be 300° C. or more, about 150° C., 300° C. or more, and about 250° C., respectively. The coercivities $H_{c1}$, $H_{c2}$, and $H_{c4}$ are set to be about 100 Oe, 1.5 kOe, and 10–20 koe at room temperature, respectively.

As to the magnetization of the rare-earth (RE)-transition-metal (TM) ferrimagnetic film having a compensation temperature, a sub-lattice magnetization of a rare-earth metal element is dominant at temperatures lower than the compensation temperature. A sublattice magnetization of a transition metal element is dominant at temperatures higher than the compensation temperature. Therefore, at about the Curie temperature $T_{c4}$ of the recording magnetic film 39 at which the recording is performed, the controlling magnetic film 38 as well as the recording magnetic film 39 is desired to be in a state in which the sub-lattice magnetization of a transition metal element is dominant, in order not to prevent the formation of recorded magnetic domains 41 to the recording magnetic film 39 in the recording magnetic field $H_w$ by the effect of the exchange-coupling force from the controlling magnetic film 38 to the recording magnetic film 39.

FIG. 4 shows the dependencies on temperature of $H_i$, $H_r$, $H_{c1}$, $H_{c2}$, $H_{c4}$, and the coupling force $H_{2-4}$ between the switching magnetic film 37 and the recording magnetic film 39 via the controlling magnetic film 38 at this time. If it is assumed that the highest temperature of the recording layer 42 in a readout light spot is $T_m$, the conditions of $T_m<T_{c1}$, $T_m>T_{c2}$, $T_m<T_{c3}$, and $T_m<T_{c4}$ are established, and the conditions of $H_{c1}<H_{c4}$ and $H_{c2}<H_{c4}$ in the temperature range of room temperature to $T_m$ are established. As is understood, the coercivity of the controlling magnetic film 38 is very small and has no influence on the operation, so that it is omitted.

Information is thermally and magnetically recorded on the recording magnetic film 39 as the recorded magnetic domains 41 in recording magnetic field $H_w$ (about 100 to 300 Oe) by a magnetic field modulation recording method. At room temperature, due to the exchange-coupling force suppressing effect of the controlling magnetic film 38, the exchange-coupling force $H_{2-4}$ of the recording magnetic film 39 to the switching magnetic film 37 is reduced, so that $H_{2-4}$ has the relationships to the magnetic fields as shown in FIG. 4. Accordingly, if the initializing magnetic field $H_i$ is reduced to 3 kOe or lower, the conditions of $H_{c1}<H_{1-2}$, $H_{c2}<H_{2-4}$, $H_{c4}>H_{4-2}$, and $H_{c2}+H_{2-4}<H_i<H_{c4}$ can be easily established. Therefore, the magnetizations of the readout magnetic film 36 and the switching magnetic film 37 are aligned with the direction of the initializing magnetic field $H_i$, and there is no recorded magnetic domain 41 in the readout magnetic film 36. In FIG. 3A, for the purpose for showing a state where the recorded magnetic domains 41 recorded on the recording magnetic film 39 do not exist on the readout magnetic film 36, the recorded magnetic domains 41 are indicated by broken lines.

When the information is read out from the MO recording medium, the temperature of the recording layer 42 is increased by the irradiation of the readout light. The intensity of the focused readout light has a Gaussian distribution, and the MO recording medium is moved with respect to the readout light. Accordingly, the temperature distribution in the vicinity of the readout light spot is asymmetrically shifted rearward from the center of the readout light spot 43, as is shown in FIG. 3A. As a result, a high-temperature region 44 whose temperature is equal to or higher than a predetermined temperature and is equal to or lower than another predetermined temperature is formed. In this example, the readout operation is performed in the readout magnetic field $H_r$ of about 300 Oe.

As is seen from the relationships in FIG. 4, even if the temperature of the recording layer 42 is increased by the irradiation of the readout light, in the region at about 110° C. or less, the condition of $H_{c2}>H_{2-4}$ is still established by the influence of the exchange-coupling force suppressing effect of the controlling magnetic film 38. Therefore, the transfer of the recorded magnetic domains 41 from the recording magnetic film 39 to the switching magnetic film 37 does not occur. As a result, the transfer of the recorded magnetic domains 41 to the readout magnetic film 36 which is coupled with the switching magnetic film 37 by the exchange-coupling force $H_{1-2}$ does not occur.

In the region in which the temperature of the recording layer 42 is increased to about 110° C. or more, i.e., when the temperature of the region of the recording layer 42 is increased to about the compensation temperature (130° C.) of the controlling magnetic film 38, the exchange-coupling force suppressing effect of the controlling magnetic film 38 is reduced. Thus, the exchange-coupling force $H_{2-4}$ is increased to about 1–2.6 kOe, so that the conditions of $H_{c2}<H_{2-4}$, and $H_{c4}>H_{4-2}$ can easily be established. Meanwhile, the magnetization direction of the readout magnetic film 36 is aligned with the magnetization direction of the switching magnetic film 37 by the exchange-coupling force $H_{1-2}$. As a result, in such a region, the magnetization direction of a part 36a of the readout magnetic film 36 is aligned with the magnetization direction of the recording magnetic film 39 by the exchange-coupling force $H_{1-4}$ via the switching magnetic film 37 and the controlling magnetic film 38. Therefore, the recorded magnetic domains 41 of the recording magnetic film 39 are transferred to the readout magnetic film 36.

In the region in which the temperature of recording layer 42 is increased to about 150° C. or more, i.e., when the temperature of the region is increased to about the Curie temperature (about 150° C.) of the switching magnetic film 37, the magnetization of the switching magnetic film 37 is lost. Thus, the exchange-coupling between the readout magnetic film 36 and the recording magnetic film 39 in this region is cut off. As is seen from FIG. 4, since $H_r>H_{c1}$ the magnetization direction of the readout magnetic film 36 in this region is aligned with the direction of the readout magnetic film $H_r$. That is, in this region, the readout magnetic film 36 has no recorded magnetic domain 41.

As described above, by the readout light having the intensity by which the maximum temperature of the irradiated region is about 150° C. or more, the recorded information can be detected as a readout signal from the high-temperature region 44 having temperatures from 110° C. or more to 150° C. or less of the readout light spot 43. This means that a recorded magnetic domain having a length smaller than the diameter of the readout light spot can be read out without signal interference of the recorded magnetic domains positioned forward and rearward.

At this time, it is desired that the Curie temperature $T_{c1}$ of the readout magnetic film 36 is set to be equal to or higher than the Curie temperature $T_{c4}$ of the recording magnetic film 39, in order to obtain a Kerr rotation angle sufficient for the relatively high intensity of the readout light, and in order to use the recording temperature as low as possible.

The Curie temperatures and coercivities of the respective magnetic films of the recording layer 42 can be relatively easily changed by the composition selection and the addition of various elements which cause the magnitude of perpendicular magnetic anisotropy to vary.

Therefore, an MO recording medium with high performance can be realized in which the initializing field for the initializing operation is reduced, and the compositions of the respective magnetic films can be variously selected for a good initializing operation and a good transfer operation.

In this example, the substrate 34 is made of polycarbonate, the protective layers 35 and 40 are made of ZnS films, the readout magnetic film 36 is made of a GdFeCo film, the switching magnetic film 37 is made of a TbFeCo film, the controlling magnetic film 38 is made of a GdFeCo film, and the recording magnetic film 39 is made of a TbFeCo film. Alternatively, the substrate 34 may be made of another type of plastic or glass. The protective layers 35 and 40 may be made of a nitride film such as SiN, an oxide film such as tantalum oxide, a chalcogenide film such as ZnSe, or a film of mixture thereof. The controlling magnetic film 38 may be made of another ferrimagnetic film such as a GdFe film, a GdCo film, a TbFeCo film, or a DyFeCo film which is an in-plane magnetic anisotropy film at room temperature, has a compensation temperature $T_{comp3}$ around the temperature at which the transfer occurs, and has a condition of $T_{c3} > T_{c2}$. Each of the readout magnetic film 36, the switching magnetic film 37, and the recording magnetic film 39 may be made of another rare-earth-transition-metal perpendicular magnetic anisotropy film, an Mn type perpendicular magnetic anisotropy film such as MnBiAl, or a perpendicular magnetic anisotropy film of another magnetic material, as far as the condition of $T_{c1} \geq T_{c4} > T_{c2} \geq T_{comp3}$ is satisfied, the conditions of $H_{c1} < H_{1-2}$, $H_{c1} < H_{c2}$, $H_{c2} > H_{2-4}$, and $H_{c2} + H_{2-4} < H_i < H_{c4}$ are satisfied at room temperature, and the conditions of $H_{c1} < H_{1-2}$, $H_{c1} < H_{c2} < H_{2-4}$, and $H_{c4} > H_{4-2}$ are satisfied at around $T_{comp3}$.

Alternatively, the controlling magnetic film 38 in FIGS. 3A and 3B may be made of a ferrimagnetic film which is an in-plane magnetic anisotropy film at room temperature, which has a compensation temperature $T_{comp3}$ which is set to be about a temperature at which the transfer occurs (e.g., about 110° C.), and which has a Curie temperature $T_{c3}$ which is higher than the transfer temperature and equal to or lower than the highest temperature in the readout light irradiation region (e.g., about 150° C.). In such a case, the controlling magnetic film 38 can serve as the switching magnetic film 37, so that the above operation can be implemented with a construction in which the switching magnetic film 37 is omitted. In this case, a TbFeCo film, a DyFeCo film, an HoFeCo film, or the like is suitable for the controlling magnetic film 38.

This example describes the case where the recording is performed by the magnetic field modulation recording method in which the recorded magnetic domain is crescent-shaped. Another case where the recording is performed by a laser power modulation recording method in which the recorded magnetic domain is circular can attain the same effects.

EXAMPLE 3

Figure 5A:
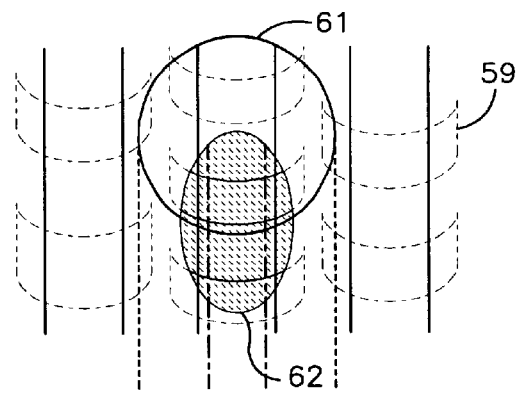
FIG. 5A is a top plan view showing a magneto-optical recording medium of a third example according to the present invention.
Figure 5B:
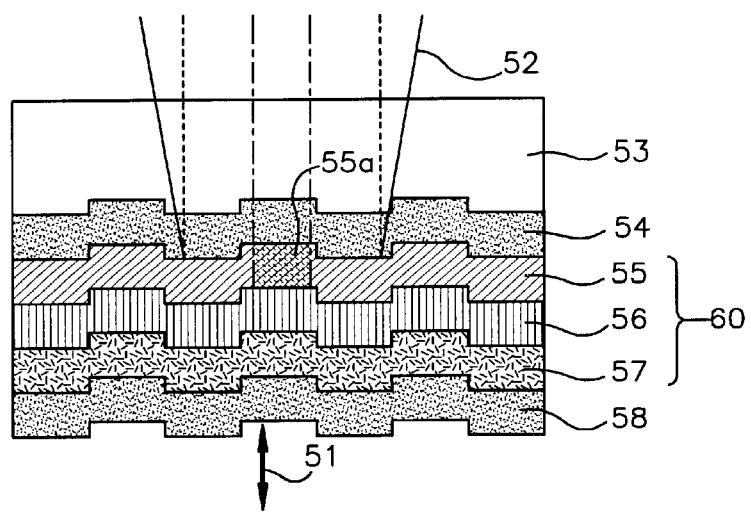
FIG. 5B is a cross-sectional view showing the magneto-optical recording medium of the third example according to the present invention.

A magneto-optic recording medium in the third example according to the invention will be described with reference to relevant figures. FIGS. 5A and 5B are a top plan view and a side cross-sectional view, respectively, showing a construction of a magneto-optical (MO) recording medium in the first example according to the invention. In this example, the recording layer has a triple magnetic-film structure of a readout magnetic film, a controlling magnetic film, and a recording magnetic film which are exchange-coupled. Unlike the first example, this example describes an MO recording medium for super resolution readout which does not necessitate an initializing magnetic field.

In FIG. 5B, an arrow 51 indicates a direction of a recording magnetic field $H_w$, and lines 52 indicate recording light or readout light. Referring to FIGS. 5A and 5B, the MO recording-medium in this example includes a substrate 53 made of polycarbonate, protective layers 54 and 58 made of SiN films, a readout magnetic film 55, a controlling magnetic film 56, a recording magnetic film 57, and recorded magnetic domains 59. The readout magnetic film 55 is made of a ferrimagnetic GdFeCo film having a Curie temperature $T_{c1}$ which is an in-plane magnetic anisotropy film at room temperature and a perpendicular magnetic anisotropy film at about 130° C. around its compensation temperature $T_{comp1}$ which is nearly equal to 160° C. The controlling magnetic film 56 is made of a ferrimagnetic GdFeCo film having a Curie temperature $T_{c2}$ which is an in-plane magnetic anisotropy film at room temperature and has a compensation temperature $T_{comp2}$ at about 150° C. The recording magnetic film 57 is made of a perpendicular magnetic anisotropy TbFeCo film having a Curie temperature $T_{c3}$ and a coercivity $H_{c3}$. The readout magnetic film 55 and the recording magnetic film 57 are exchange-coupled via the controlling magnetic film 56, and these three magnetic films constitute a recording layer 60. The respective films on the substrate 53 are formed by a sputtering system or a vacuum evaporation system. The thicknesses of the protective layers 54 and 58 are set to be 80 nm. The thicknesses of the readout magnetic film 55, the controlling magnetic film 56, and the recording magnetic film 57 are set to be 40 nm, 5–10 nm, and 50 nm, respectively. The Curie temperatures $T_{c1}$, $T_{c2}$, and $T_{c3}$ are 300° C. or more, 300° C. or more, and about 230° C., respectively. The coercivity $H_{c3}$ is set to be 10–20 kOe at room temperature.

As to the magnetization of the rare-earth (RE)-transition-metal (TM) ferrimagnetic film having a compensation temperature, a sub-lattice magnetization of a rare-earth metal element is dominant at temperatures lower than the compensation temperature. A sub-lattice magnetization of a transition metal element is dominant at temperatures higher than the compensation temperature. Therefore, at about the Curie temperature $T_{c3}$ of the recording magnetic film 57 at which the recording is performed, the readout magnetic film 55 and the controlling magnetic film 56 as well as the recording magnetic film 57 are desired to be in a state in which the sub-lattice magnetization of a transition metal element is dominant, in order not to prevent the formation of recorded magnetic domains 59 to the recording magnetic film 57 in the recording magnetic field $H_w$ by the effect of the exchange-coupling force from the readout magnetic film 55 and the controlling magnetic film 56 to the recording magnetic film 57.

The ferrimagnetic GdFeCo film which is an in-plane magnetic anisotropy film at room temperature and a perpendicular magnetic anisotropy film at around the compensation temperature $T_{comp1}$ is prepared in the following manner.

Figure 6:
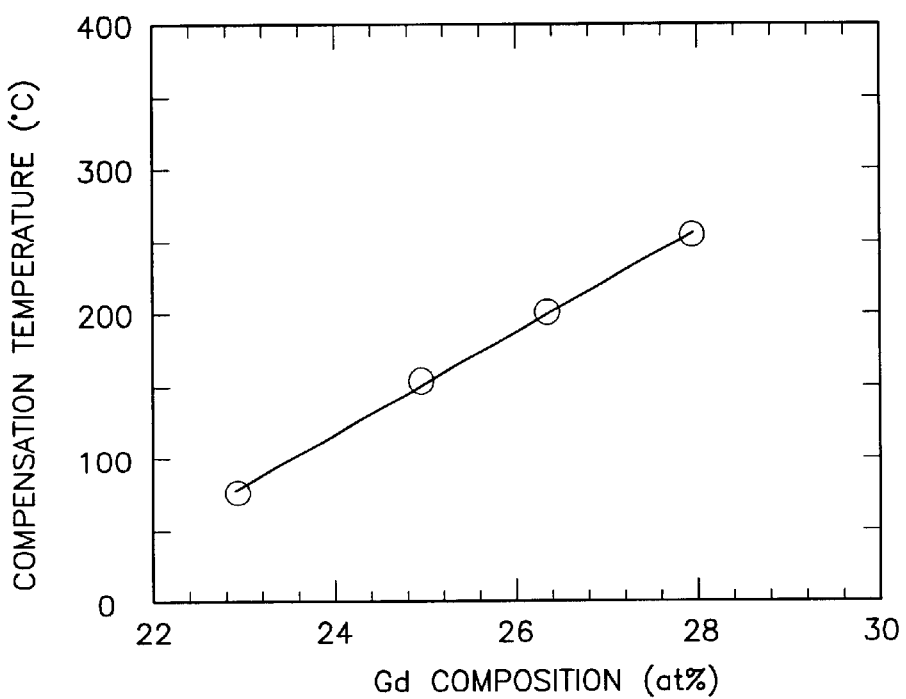
FIG. 6 is a graph showing the relationship between the compensation temperature and the Gd composition.

FIG. 6 shows the relationship between the Gd composition of the GdFeCo film and the compensation temperature. The value of $T_{comp1}$ is substantially determined by the Gd composition ratio. Specifically, when the Gd composition is 23–28 at %, $T_{comp1}$ is 80–260° C. Considering the intensity of the readout light, the above range is sufficient for the Gd composition of the readout magnetic film 55.

Figure 7:
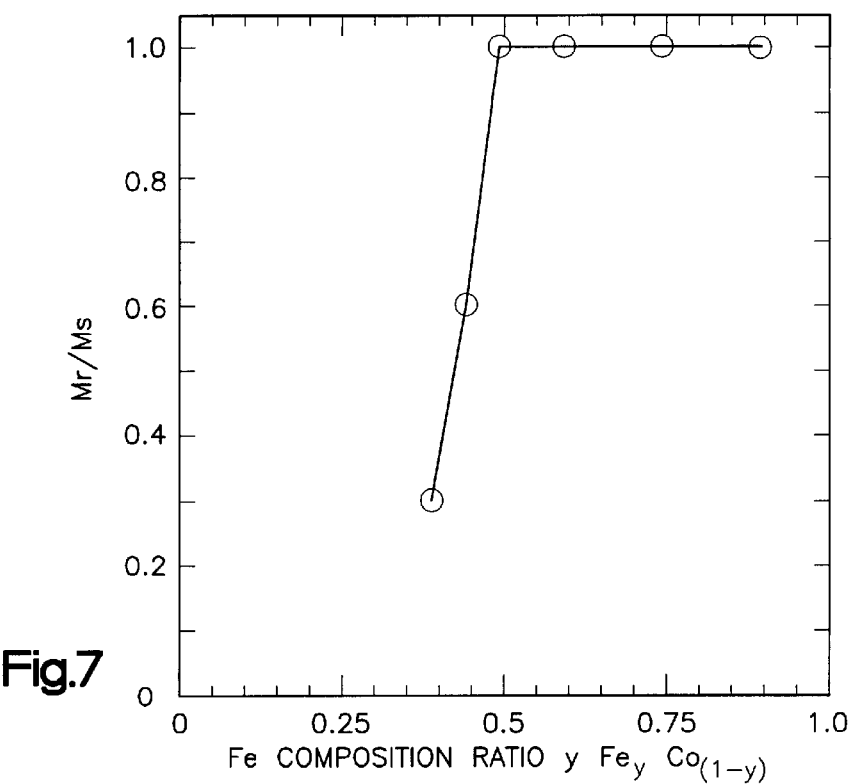
FIG. 7 is a graph showing the relationship between the residual magnetization $M_r$/saturated magnetization $M_s$ and the composition ratio of Fe to Co.
Figure 8:
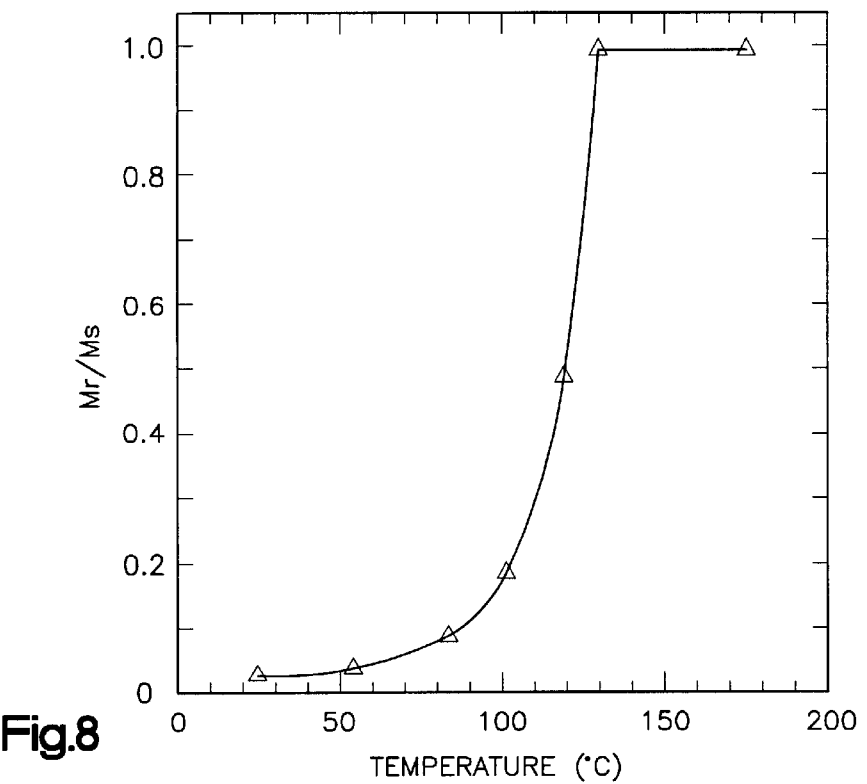
FIG. 8 is a graph showing the relationship between the residual magnetization $M_r$/saturated magnetization $M_s$ and the temperature.

FIG. 7 shows the relationship between the composition ratio of Fe to Co and the ratio of residual magnetization to saturated magnetization (Mr/Ms) at the compensation temperature of the GdFeCo film. For the perpendicular magnetic film, Mr/Ms is nearly equal to 1. FIG. 8 shows the relationship between a temperature and a value of Mr/Ms of the GdFeCo film in the case of $Gd_{0.25}Fe_{0.39}Co_{0.36}$.

Therefore, it is found that if the composition is selected such that the composition ratio of Fe to Co is about 1 or more, a film which is an in-plane magnetic anisotropy film at room temperature and a perpendicular magnetic anisotropy film at about the compensation temperature can be realized. Additionally, when the composition ratio of Fe is increased, the film becomes a perpendicular magnetic anisotropy film at a more decreased temperature which is equal to or lower than the compensation temperature.

When the composition of the readout magnetic film 55 is $Gd_{0.25}Fe_{0.39}Co_{0.36}$, the compensation temperature $T_{comp1}$ is about 160° C. and the perpendicular external magnetic field necessary for directing the magnetization perpendicularly at room temperature is about 2 kOe.

Information is thermally and magnetically recorded on the recording magnetic film 57 as the recorded magnetic domains 59 in recording magnetic field $H_w$ (about 100 to 300 Oe) by a magnetic field modulation recording method. At room temperature, the readout magnetic film 55 is an in-plane magnetic anisotropy film, and due to the exchange-coupling force suppressing effect of the controlling magnetic film 56, the exchange-coupling force $H_{1-3}$ of the recording magnetic film 57 to the readout magnetic film 55 is reduced. FIG. 9 shows the relationship between a temperature and the exchange-coupling force $H_{1-3}$ in the case where the controlling magnetic film 56 has a thickness of 7.5 nm. In FIG. 9, since the readout magnetic film 55 is an in-plane magnetic anisotropy film, the exchange-coupling force is indicated by an average of the strengths which act on the entire readout magnetic film 55. At room temperature, $H_{1-3}$ is about 700 Oe. The magnetization in the thickness direction of the readout magnetic film 55 which is an in-plane magnetic anisotropy film has more perpendicular component toward the controlling magnetic film 56 by $H_{1-3}$. However, the magnetization on the side on which the readout light is incident is not affected by $H_{1-3}$, so that the in-plane magnetization is maintained. On the other hand, the Kerr effect is generated by the magnetization around the surface of the magnetic film. Therefore, if it is viewed from the readout light, at around room temperature, the surface magnetization of the readout magnetic film 55 is directed in the in-plane direction, so that the polar Kerr rotation angle is almost 0. Accordingly, the recorded magnetic domains 59 cannot be detected in the readout magnetic film 55. In FIG. 5A, for the purpose for showing the state where the recorded magnetic domains 59 recorded on the recording magnetic film 57 cannot be detected from the readout magnetic film 55, the recorded magnetic domains 59 are indicated by broken lines.

When the information is read out from the MO recording medium, the temperature of the recording layer 60 is increased by the irradiation of the readout light. The intensity of the focused readout light has a Gaussian distribution, and the MO recording medium is moved with respect to the readout light. Accordingly, the temperature distribution in the vicinity of the readout light spot is asymmetrically shifted rearward from the center of the readout light spot 61, as is shown in FIG. 5A. As a result, a high-temperature region 62 whose temperature is equal to or higher than a predetermined temperature is formed.

When the temperature of a part 55a of the readout magnetic film 55 is increased to about 130° C. or a higher temperature, i.e., when the temperature of a part 55a is increased to about the compensation temperature (160° C.) of the readout magnetic film 55 and the compensation temperature (150° C.) of the controlling magnetic film 56, the readout magnetic film 55 becomes a perpendicular magnetic anisotropy film having a coercivity $H_{c1}$ (about 150 Oe), and the exchange-coupling force suppressing effect of the controlling magnetic film 56 is reduced. Thus, the exchange-coupling force $H_{1-3}$ is increased to about 1.8 kOe, and all the magnetization in the thickness direction of the readout magnetic film 55 is perpendicular, so that the conditions of $H_{c1}<H_{1-3}$, and $H_{c3}>H_{3-1}$ can easily be established. Therefore, the magnetization direction of the part 55a of the readout magnetic film 55 is aligned with the magnetization direction of the recording magnetic film 57. As a result, the recorded magnetic domains 59 of the recording magnetic film 57 are transferred to the readout magnetic film 55.

As described above, the recorded information can be detected as a readout signal from the high-temperature region 62 having a temperature of about 130° C. or higher of the readout light spot 61. This means that a recorded magnetic domain having a length smaller than the diameter of the readout light spot can be read out without a signal interference of the recorded magnetic domain positioned forward.

At this time, it is desired that the Curie temperature $T_{c1}$ of the readout magnetic film 55 is set to be equal to or higher than the Curie temperature $Tc_3$ of the recording magnetic film 57, in order to obtain a Kerr rotation angle sufficient for the relatively high intensity of the readout light, and in order to use the recording temperature as low as possible.

In FIGS. 5A and 5B, the readout magnetic film 55 may alternatively be made of a magnetic film which has sufficiently large in-plane magnetic anisotropy at room temperature, and the in-plane magnetic anisotropy state is maintained while the magnetization on the side on which the readout light is incident is not influenced by $H_{1-3}$ without the controlling magnetic film 56. In such a case, the above operation can be implemented by a construction in which the controlling magnetic film 56 is omitted. Such a readout magnetic film may have the Fe/Co composition ratio of about 1, for example, a composition of $Gd_{0.245}Fe_{0.378}Co_{0.377}$ or the like. In the case where the composition is $Gd_{0.25}Fe_{0.39}CO_{0.36}$, if the film has a thickness of about 70 nm or more, the exchange-coupling force $H_{1-3}$ from the recording magnetic film 57 does not affect the magnetization around the surface of the readout magnetic film 55 on the side on which the readout light is incident. As a result, the controlling magnetic film 56 can be omitted.

The Curie temperatures and coercivities of the respective magnetic films of the recording layer 60 can relatively easily be changed by the composition selection and the addition of various elements which cause the magnitude of perpendicular magnetic anisotropy to vary. Accordingly, it is possible to prepare an optimum MO recording medium even if the recording/readout conditions required for the MO recording medium are changed.

Therefore, an MO recording medium with high performance can be realized in which the initializing operation is not required, and the compositions of the respective magnetic films can be variously selected for a good transfer operation.

In this example, the substrate 53 is made of polycarbonate, the protective layers 54 and 58 are made of SiN films, the readout magnetic film 55 is made of a GdFeCo film, the controlling magnetic film 56 is made of a GdFeCo film, and the recording magnetic film 57 is made of a TbFeCo film. Alternatively, the substrate 53 may be made of another type of plastic or glass. The protective layers 54 and 58 may be made of a nitride film such as AlN, an oxide film such as tantalum oxide, a chalcogenide film such as ZnS, or a film of mixture thereof. The readout magnetic film 55 may be made of another ferrimagnetic film in which $T_{c1} \geq T_{c3} > T_{comp2}$, and $T_{comp1}$ is about $T_{comp2}$, and which is an in-plane magnetic anisotropy film at room temperature and a perpendicular magnetic anisotropy film at about $T_{comp2}$ at which $H_{c1} < H_{1-3}$, or may be made of a spin rearranged magnetic film such as a rare-earth orthoferrite magnetic film having a spin rearranged temperature of around $T_{comp2}$. The controlling magnetic film 56 may be made of another ferrimagnetic film such as a GdCo film, a GdFe film, a TbFeCo film, or a DyFeCo film which is an in-plane magnetic anisotropy film at room temperature, and has a compensation temperature $T_{comp2}$ around the temperature at which the transfer occurs. The recording magnetic film 57 may be made of another rare-earth-transition-metal perpendicular magnetic anisotropy film, an Mn type perpendicular magnetic anisotropy film such as MnBiAl, or a perpendicular magnetic anisotropy film of another magnetic material, as far as the condition of $T_{c1} \geq T_{c3} > T_{comp2}$ is satisfied and the conditions that $H_{c3}$ is sufficiently large at room temperature, and $H_{c3} > H_{3-1}$ at about $T_{comp2}$ are satisfied.

This example describes a case where the recording is performed by the magnetic field modulation recording method in which the recorded magnetic domain is crescent-shaped. Another case where the recording is performed by a laser power modulation recording method in which the recorded magnetic domain is circular can attain the same effects.

EXAMPLE 4

A magneto-optical (MO) recording medium in the fourth example according to the invention will be described with reference to relevant figures. FIGS. 10A and 10B are a top plan view and a side cross-sectional view, respectively, showing a construction of the MO recording medium in this example. In this example, the recording layer has a four magnetic-film structure of a readout magnetic film, a switching magnetic film, a controlling magnetic film, and a recording magnetic film which are exchange-coupled. Unlike the second example, this example describes an MO recording medium for super resolution readout for which an initializing magnetic field is not required.

In FIG. 10B, an arrow 91 indicates a direction of a readout magnetic field $H_r$, an arrow 92 indicates a direction of a recording magnetic field $H_w$, and lines 93 indicate recording light or readout light. Referring to FIGS. 10A and 10B, the MO recording medium in this example includes a substrate 94 made of polycarbonate, protective layers 95 and 100 made of SiON films, a readout magnetic film 96, a controlling magnetic film 97, a switching magnetic film 98, a recording magnetic film 99, and recorded magnetic domains 101. The readout magnetic film 96 is made of a ferrimagnetic GdFeCo film having a Curie temperature $T_{c1}$ which is an in-plane magnetic anisotropy film at room temperature and a perpendicular magnetic anisotropy film at about 110° C. around its compensation temperature $T_{comp1}$ which is nearly equal to 140° C. The controlling magnetic film 97 is made of a ferrimagnetic GdFeCo film having a Curie temperature $T_{c2}$ which is an in-plane magnetic anisotropy film at room temperature and has a compensation temperature $T_{comp2}$ at about 130° C. The switching magnetic film 98 is made of a perpendicular magnetic anisotropy GdTbFe film having a Curie temperature $T_{c3}$ and a coercivity $H_{c3}$ The recording magnetic film 99 is made of a perpendicular magnetic anisotropy TbFeCo film having a Curie temperature $T_{c4}$ and a coercivity $H_{c4}$. The readout magnetic film 96 and the recording magnetic film 99 are exchange-coupled via the controlling magnetic film 97 and the switching magnetic film 98, and these four magnetic films constitute a recording layer 102. The respective films on the substrate 94 are formed by a sputtering system or a vacuum evaporation system. The thicknesses of the protective layers 95 and 100 are set to be 100 nm. The thicknesses of the readout magnetic film 96, the controlling magnetic film 97, the switching magnetic film 98, and the recording magnetic film 99 are set to be 40 nm, 5–10 nm, 10 nm, and 45 nm, respectively. The Curie temperatures $T_{c1}$, $T_{c2}$, $T_{c3}$, and $T_{c4}$ are set to be 300° C. or more, 300° C. or more, about 150° C., and about 250° C., respectively. The coercivities $H_{c3}$ and $H_{c4}$ are set to be about 1 kOe, and 10–20 kOe at room temperature, respectively.

The readout magnetic film 96 which is an in-plane magnetic anisotropy film at room temperature and a perpendicular magnetic anisotropy film at about 110° C. around $T_{comp1}$ which is nearly equal to 140° C. can be realized by the composition of $Gd_{0.245}Fe_{0.39}Co_{0.365}$.

Information is thermally and magnetically recorded on the recording magnetic film 99 as the recorded magnetic domains 101 in recording magnetic field $H_w$ (about 100 to 300 Oe) by a magnetic field modulation recording method. At room temperature, since $H_{c3} < H_{3-4}$, the recorded magnetic domains 101 of the recording magnetic film 99 is transferred to the switching magnetic film 98. However, due to the exchange-coupling force suppressing effect of the controlling magnetic film 97, the exchange-coupling force $H_{1-4}$ of the recording magnetic film 99 to the readout magnetic film 96 via the switching magnetic film 98 and the controlling magnetic film 97 is reduced. Therefore, the same as in the third example, the magnetization in the thickness direction of the readout magnetic film 96 has more perpendicular components toward the controlling magnetic film 97 by $H_{1-4}$. The magnetization on the side on which the readout light is incident is not affected by $H_{1-4}$, so that the in-plane magnetization is maintained. On the other hand, the Kerr effect is generated by the magnetization around the surface of the magnetic film. Therefore, if it is viewed from the readout light, at around room temperature, the surface magnetization of the readout magnetic film 96 is directed in the in-plane direction, so that the polar Kerr rotation angle is almost 0. Accordingly, the recorded magnetic domains 101 cannot be detected in the readout magnetic film 96. In FIG. 10A, for the purpose for showing the state where the recorded magnetic domains 101 recorded on the recording magnetic film 99 cannot be detected from the readout magnetic film 96, the recorded magnetic domains 101 are indicated by broken lines.

When the information is read out from the MO recording medium, the same as in the second example, the temperature distribution in the vicinity of the readout light spot is asymmetrically shifted rearward from the center of the readout light spot 103, as is shown in FIG. 10A. As a result, a high-temperature region 104 whose temperature is equal to or higher than a predetermined temperature and is equal to or lower than another predetermined temperature is formed. In this example, the readout operation is performed in the readout magnetic field $H_r$ of about 300 Oe.

Even if the temperature of the recording layer 102 is increased by the irradiation of the readout light, in the region at about 110° C. or less, the readout magnetic film 96 is still the in-plane magnetic anisotropy film. Thus, the magnetization of the readout magnetic film 96 on the side on which the readout light is incident is maintained to be in the in-plane magnetic state because it is not affected by $H_{1-4}$ due to the exchange-coupling force effect of the controlling magnetic film 97. As a result the recorded magnetic domain 101 cannot be detected in the readout magnetic film 96.

In the region in which the temperature of the recording layer 102 is increased to about 110° C. or more, i.e., when the temperature of the region of the recording layer 102 is increased to about the compensation temperature (140° C.) of the readout magnetic film 96 and the compensation temperature (130° C.) of the controlling magnetic film 97, the readout magnetic film 96 becomes the perpendicular magnetic anisotropy film having a coercivity $H_{c1}$ (about 150 Oe). In addition, the exchange-coupling force suppressing effect of the controlling magnetic film 97 is reduced. Thus, the exchange-coupling force $H_{1-4}$ is increased to about 1–2 kOe, and all the magnetization in the thickness direction of the readout magnetic film 96 becomes perpendicular. As a result, the conditions of $H_{c1}<H_{1-4}$, and $H_{c4}>H_{4-1}$ can easily be established. In addition, at this time, $H_{c3}<H_{3-4}$, so that the magnetization direction of the switching magnetic film 98 is aligned with the magnetization direction of the recording magnetic film 99 by the exchange-coupling force $H_{3-4}$. Therefore, in this region, the magnetization direction of a part 96a of the readout magnetic film 96 is aligned with the magnetization direction of the recording magnetic film 99 by the exchange-coupling force $H_{1-4}$ via the controlling magnetic film 97 and the switching magnetic film 98. As a result, the recorded magnetic domain 101 of the recording magnetic film 99 is transferred to the readout magnetic film 96.

In the region in which the temperature of recording layer 102 is increased to about 150° C. or more, i.e., when the temperature of the region is increased to the Curie temperature (about 150° C.) of the switching magnetic film 98 or more, the magnetization of the switching magnetic film 98 is lost. Thus, the exchange-coupling between the readout magnetic film 96 and the recording magnetic film 99 in this region is cut off. The coercivity $H_{c1}$ is about 150 Oe, and the coercivity $H_{c2}$ of the controlling magnetic film 97 in the perpendicular direction is very small, so that $H_r>H_{c1}+H_{c2}$. AS a result, the magnetization direction of the readout magnetic film 96 in this region is aligned with the direction of the readout magnetic field $H_r$. That is, in this region, the readout magnetic film 96 has no recorded magnetic domains 101.

As described above, by the readout light having the intensity by which the maximum temperature of the irradiated region is about 150° C. or more, the recorded information can be detected as a readout signal from the high-temperature region 104 having temperatures from 110° C. or more to 150° C. or less of the readout light spot 103. This means that a recorded magnetic domain having a length smaller than the diameter of the readout light spot can be read out without a signal interference of the recorded magnetic domains positioned forward and rearward.

At this time, it is desired that the Curie temperature $T_{c1}$ of the readout magnetic film 96 is set to be equal to or higher than the Curie temperature $T_{c4}$ of the recording magnetic film 99, in order to obtain a Kerr rotation angle sufficient for the relatively high intensity of the readout light, and in order to use the recording temperature as low as possible.

In FIGS. 10A and 10B, the readout magnetic film 96 may alternatively be made of a magnetic film which has sufficiently large in-plane magnetic anisotropy at room temperature, and the in-plane magnetic anisotropy state is maintained while the magnetization on the side on which the readout light is incident is not influenced by $H_{1-4}$ without the controlling magnetic film 97. In such a case, the above operation can be implemented by a construction in which the controlling magnetic film 97 is omitted. Such a readout magnetic film may have the Fe/Co composition ratio of about 0.5, for example, a composition of $Gd_{0.24}Fe_{0.38}Co_{0.38}$ or the like. In the case where the composition is $Gd_{0.245}Fe_{0.39}Co_{0.365}$, if the film has a thickness of 70 nm or more, the exchange-coupling force $H_{1-4}$ from the recording magnetic film 99 does not affect the magnetization around the surface of the readout magnetic film 96 on the side on which the readout light is incident. As a result, the controlling magnetic film 97 can be omitted.

The Curie temperatures and coercivities of the respective magnetic films of the recording layer 102 can relatively easily be changed by the composition selection and the addition of various elements which cause the magnitude of perpendicular magnetic anisotropy to vary. Accordingly, it is possible to prepare an optimum MO recording medium even if the recording/readout conditions required for the MO recording medium are changed.

Therefore, an MO recording medium with high performance can be realized in which the initializing operation is not required, and the compositions of the respective magnetic films can be variously selected for a good transfer operation.

In this example, the substrate 94 is made of polycarbonate, the protective layers 95 and 100 are made of SiON films, the readout magnetic film 96 is made of a GdFeCo film, the controlling magnetic film 97 is made of a GdFeCo film, the switching magnetic film 98 is made of a GdTbFe film, and the recording magnetic film 99 is made of a TbFeCo film. Alternatively, the substrate 94 may be made of another type of plastic or glass. The protective layers 95 and 100 may be made of a nitride film such as SiN, an oxide film such as tantalum oxide, a chalcogenide film such as ZnSe, or a film of mixture thereof. The readout magnetic film 96 may be made of another ferrimagnetic film in which $T_{c1} \geq T_{c4}>T_{comp2}$, and $T_{comp1}$ is about $T_{comp2}$, and which is an in-plane magnetic anisotropy film at room temperature and a perpendicular magnetic anisotropy film at about $T_{comp2}$ at which $H_{c1}<H_{1-4}$, or may be made of a spin rearranged magnetic film such as a rare-earth orthoferrite magnetic film having a spin rearranged temperature of around $T_{comp2}$. The controlling magnetic film 97 may be made of another ferrimagnetic film such as a GdCo film, a GdFe film, a TbFeCo film, or a DyFeCo film which is an in-plane magnetic anisotropy film at room temperature, and has a compensation temperature $T_{comp2}$ around the temperature at which the transfer occurs. Each of the switching magnetic film 98 and the recording magnetic film 99 may be made of another rare-earth-transition-metal perpendicular magnetic anisotropy film, an Mn type perpendicular magnetic anisotropy film such as MnBiAl, or a perpendicular magnetic anisotropy film of another magnetic material, as far as the condition of $T_{c1} \geq T_{c4}>T_{c3} \geq T_{comp2}$ is satisfied and the conditions that $H_{c3}<H_{c4}$ and $H_{c4}>H_{4-3}$ are satisfied at room temperature, and the conditions of $H_{c1}<H_{c3}<H_{3-4}$ and $H_{c4}>H_{4-3}$ are satisfied at about $T_{comp2}$.

Alternatively, the controlling magnetic film 97 in FIGS. 10A and 10B may be made of a ferrimagnetic film which is an in-plane magnetic anisotropy film at room temperature, which has a compensation temperature $T_{comp3}$ which is set to be about a temperature at which the transfer occurs (e.g., about 110° C.), and which has a Curie temperature $T_{c2}$ which is higher than the transfer temperature and equal to or lower than the highest temperature in the readout light irradiation region (e.g., about 150° C.). In such a case, the controlling magnetic film 97 can serve as the switching magnetic film 98, so that the above operation can be implemented with a construction in which the switching magnetic film 98 is omitted. In this case, a TbFeCo film, a DyFeCo film, an HoFeCo film, or the like is suitable for the controlling magnetic film 97.

This example describes a case where the recording is performed by the magnetic field modulation recording method in which the recorded magnetic domain is crescent-shaped. Another case where the recording is performed by a laser power modulation recording method in which the recorded magnetic domain is circular can attain the same effects.

EXAMPLE 5

Figure 11A:
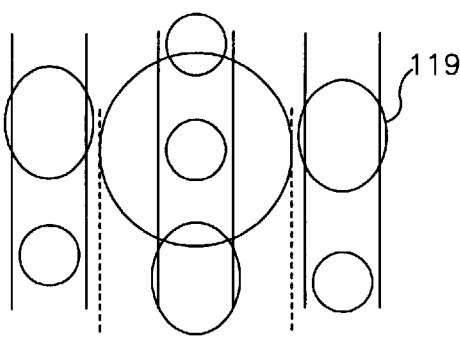
FIG. 11A is a top plan view showing a magneto-optical recording medium of a fifth example according to the present invention.
Figure 11B:
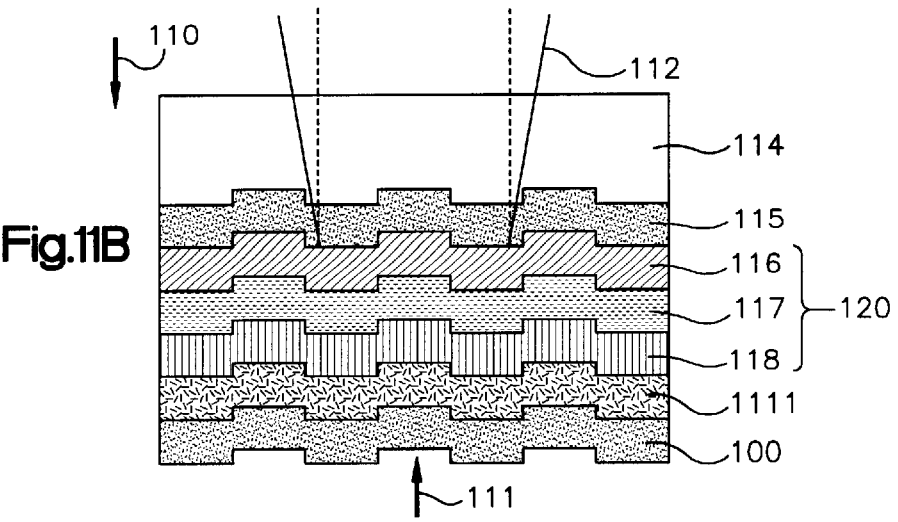
FIG. 11B is a cross-sectional view showing the magneto-optical recording medium of the fifth example according to the present invention.

A magneto-optical (MO) recording medium in the fifth example according to the invention will be described with reference to relevant figures. FIGS. 11A and 11B are a top plan view and a side cross-sectional view, respectively, showing a construction of the MO recording medium in the fifth example. This example describes an MO recording medium for laser power modulation overwrite in which the recording layer has a triple magnetic-film structure of a recording/readout magnetic film, a controlling magnetic film, and a supporting magnetic film which are exchange-coupled.

In FIG. 11B, an arrow 110 indicates a direction of an initializing magnetic field $H_i$, an arrow 111 indicates a direction of a recording magnetic field $H_w$, and lines 112 indicate recording light or readout light. Referring to FIGS. 11A and 11B, the MO recording medium in this example includes a substrate 113 made of polycarbonate, protective layers 114 and 118 made of SiN films, a recording/readout magnetic film 115, a controlling magnetic film 116, a supporting magnetic film 117, and recorded magnetic domains 119. The recording/readout magnetic film 115 is made of a perpendicular magnetic anisotropy TbFeCo film having a Curie temperature $T_{c1}$ and a coercivity $H_{c1}$. The controlling magnetic film 116 is made of a ferrimagnetic GdFeCo film having a Curie temperature $T_{c2}$ which is an in-plane magnetic anisotropy film at room temperature and has a compensation temperature $T_{comp2}$ at about 190° C. The supporting magnetic film 117 is made of a perpendicular magnetic anisotropy GdTbFeCo film having a Curie temperature $T_{c3}$ and a coercivity $H_{c3}$. The recording/readout magnetic film 115 and the supporting magnetic film 117 are exchange-coupled via the controlling magnetic film 116, and these three magnetic films constitute a recording layer 120. The respective films on the substrate 113 are formed by a sputtering system or a vacuum evaporation system. The thicknesses of the protective layers 114 and 118 are set to be 80 nm. The thicknesses of the recording/readout magnetic film 115, the controlling magnetic film 116, and the supporting magnetic film 117 are set to be 50 nm, 5–15 nm, and 50 nm, respectively. The Curie temperatures $T_{c1}$, $T_{c2}$, and $T_{c3}$ are set to be about 190° C., 300° C. or more, and about 260° C., respectively. The coercivities $H_{c1}$ and $H_{c3}$ are set to be about 10–20 kOe, and about 1.5 kOe at room temperature, respectively.

The recording/readout magnetic film 115 is used for the recording or readout of information, and the supporting magnetic film 117 is used for supporting the recording of information onto the recording/readout magnetic film 115. The controlling magnetic film 116 is used for controlling the exchange-coupling force $H_{1-3}$ between the recording/readout magnetic film 115 and the supporting magnetic film 117.

Due to the exchange-coupling force suppressing effect of the controlling magnetic film 116, $H_{1-3}$ and $H_{3-1}$ are 1 kOe or less at room temperature. In the case where $H_{c3}$ is set to be 1.5 kOe, the conditions of $H_{c1}$, $H_{1-3}$, $H_{c3}>H_{3-1}$, and $H_{c3}+H_{3-1}<H_i<H_{c1}$ are easily established even when the initializing magnetic field $H_i$ is reduced to be 3 koe or less. As a result, only the magnetization of the supporting magnetic film 117 is aligned with the direction of the initializing magnetic field $H_i$ at room temperature.

The recording for the MO recording medium is performed by two intensity levels of recording light, i.e., a low level and a high level. In this example, the recording is performed in the recording magnetic field $H_w$ of about 200 Oe.

In the case of the low-level recording light, the temperature of the recording layer 120 is increased to be about the Curie temperature $T_{c1}$ (190° C.) of the recording/readout magnetic film 115 by the recording light irradiation. In this case, $H_{c1}$ becomes very small, and the exchange-coupling force suppressing effect of the controlling magnetic film 116 is decreased at about the compensation temperature (190° C.) of the controlling magnetic film 116. Accordingly, the exchange-coupling force $H_{1-3}$ becomes about 500 Oe, so that the conditions of $H_{c1}+H_w<H_{1-3}$ and $H_{c3}>H_{3-1}$ can be easily established. Therefore, the direction of the initial magnetization of the supporting magnetic film 117 is transferred to the magnetization of the recording/readout magnetic film 115. Thus, the low-level recording operation performs the erasing of the recording/readout magnetic film 115.

In the case of the high-level recording light, the temperature of the recording layer 120 is increased to be about the Curie temperature $T_{c3}$ (260° C.) of the supporting magnetic film 117 by the recording light irradiation. In this case, the magnetization of the supporting magnetic film 117 is directed in the direction of the recording magnetic field $H_w$. Thereafter, in the cooling process, when the temperature of the recording layer 120 reaches about the Curie temperature $T_{c1}$ (190° C.) of the recording/readout magnetic film 115, the conditions of $H_{c1}+H_w<H_{1-3}$ and $H_{c3}>H_{3-1}$ are satisfied. Therefore, the recorded magnetization of the supporting magnetic film 117 is transferred to the recording/readout magnetic film 115 by the exchange-coupling force $H_{1-3}$. Thus, by the high-level recording operation, recorded domains 119 are formed on the recording/readout magnetic film 115.

As described above, by modulating the power of the recording light between the low level and the high level, the overwrite operation can be performed.

As to the magnetization of the rare-earth (RE)-transition-metal (TM) ferrimagnetic film having a compensation temperature, a sub-lattice magnetization of a rare-earth metal element is dominant at temperatures lower than the compensation temperature. A sub-lattice magnetization of a transition metal element is dominant at temperatures higher than the compensation temperature. Therefore, at about the Curie temperature $T_{c3}$ of the supporting magnetic film 117 at which the high-level recording is performed in the recording magnetic field $H_w$, the controlling magnetic film 116 as well as the supporting magnetic film 117 is desired to be in a state in which the sub-lattice magnetization of a transition metal element is dominant, in order not to prevent the formation of recorded magnetic domains 119 to the supporting magnetic film 117 in the recording magnetic field $H_w$ by the effect of the exchange-coupling force from the controlling magnetic film 116.

The Curie temperatures and coercivities of the respective magnetic films of the recording layer 120 can relatively easily be changed by the composition selection and the addition of various elements which cause the magnitude of perpendicular magnetic anisotropy to vary. Accordingly, it is possible to prepare an optimum MO recording medium even if the recording/readout conditions required for the MO recording medium are changed.

Therefore, an MO recording medium with high performance can be realized in which the initializing field for the initializing operation is reduced, and the compositions of the respective magnetic films can be variously selected for a good initializing operation and a good transfer operation.

In this example, the substrate 113 is made of polycarbonate, the protective layers 114 and 118 are made of SiN films, the recording/readout magnetic film 115 is made of a TbFeCo film, the controlling magnetic film 116 is made of a GdFeCo film, and the supporting magnetic film 117 is made of a GdTbFeCo film. Alternatively, the substrate 113 may be made of another type of plastic or glass. The protective layers 114 and 118 may be made of a nitride film such as AlN, an oxide film such as tantalum oxide, a chalcogenide film such as ZnS, or a film of mixture thereof. Each of the recording/readout magnetic film 115 and the supporting magnetic film 117 may be made of another rare-earth-transition-metal perpendicular magnetic anisotropy film, an Mn type perpendicular magnetic anisotropy film such as MnSiAl, or a perpendicular magnetic anisotropy film of another magnetic material, as far as the conditions of $T_{c1}$ being nearly equal to $T_{comp2}$, $T_{c1}<T_{c3}$, $T_{c1}<T_{c2}$ are satisfied, the conditions of $H_{c1}>H_{1-3}$, $H_{c3}>H_{3-1}$, and $H_{c3}+H_{3-1}<H_i<H_{c1}$ are satisfied at room temperature, and conditions of $H_{c1}+H_w<H_{1-3}$ and $H_{3-1}<H_{c3}$ are satisfied at about $T_{comp2}$. The controlling magnetic film 116 may be made of another ferrimagnetic film such as a GdFe film, a GdCo film, a TbFeCo film, or a DyFeCo film which is an in-plane magnetic anisotropy film at room temperature, and has a compensation temperature $T_{comp2}$ around the temperature at which the transfer occurs.

Now, a modified case of this example will be described. In this case, the readout magnetic film having a sufficiently large in-plane anisotropy in the third example is referred to as a readout magnetic film 55, and the recording/readout magnetic film in the fifth example is referred to as a recording magnetic film 115. The readout magnetic film 55 is provided on the side of the recording magnetic film 115 on which the light is incident in FIG. 11B.

The readout magnetic film 55 is a ferrimagnetic GdFeCo film having a Curie temperature of 300° C. or more which is an in-plane magnetic anisotropy film at room temperature and a perpendicular magnetic anisotropy film at about 100° C. around its compensation temperature $T_{comp1}$ which is nearly equal to 120° C. The thickness of the readout magnetic film 55 is set to be 70 nm.

With the above structure, by modulating the power of the recording light between the low level and the high level, the overwrite can be performed on the recording magnetic film 115. When the temperature of the recording layer 120 is increased to be 100° C. or more by the readout light irradiation, the recorded magnetic domains 119 in the recording magnetic film 115 are transferred to the readout magnetic film 55. Thus, the super resolution readout can also be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magneto-optical recording medium comprising recording means for recording information and a substrate for supporting said recording means, wherein said recording means includes:
 a recording magnetic film for recording the information, said recording magnetic film being formed of a perpendicular magnetic anisotropy film; and
 a readout magnetic film for optically reading out the information, said readout magnetic film being capable of being magnetically coupled with said recording magnetic film by an exchange-coupling force;

wherein said readout magnetic film has in-plane magnetic anisotropy at room temperature, and when the temperature of said readout magnetic film reaches a predetermined temperature by a readout light irradiation, the readout magnetic film is a perpendicular magnetic anisotropy film, said predetermined temperature being set to be higher than room temperature and lower than a Curie temperature of said readout magnetic film by adjusting a composition of said readout magnetic film, wherein said readout magnetic film is formed of a film having a compensation temperature which is equal to or higher than said predetermined temperature, said film being a perpendicular magnetic anisotropy film at about the compensation temperature, said readout magnetic film having the composition of

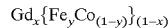

where $0.23 \leq x \leq 0.28$ and $0.5 \leq y \leq 0.75$, wherein said recording means further includes a controlling magnetic film for controlling the exchange-coupling force, said controlling magnetic film being provided between said recording magnetic film and said readout magnetic film, and wherein said controlling magnetic film has in-plane magnetic anisotropy at room temperature, thereby suppressing the exchange-coupling force between said recording magnetic film and said readout magnetic film, and said controlling magnetic film is a ferrimagnetic film having a compensation temperature which is approximately equal to said predetermined temperature, thereby when the temperature of said controlling magnetic film reaches said predetermined temperature by the readout light irradiation, the controlling magnetic film promotes the exchange-coupling force between said recording magnetic film and said readout magnetic film, whereby the information recorded in said recording magnetic film is magnetically transferred to said readout magnetic film.

2. A magneto-optical recording medium according to claim 1, wherein said controlling magnetic film is formed of a material selected from the group consisting of GdFe, GdCo, GdFeCo, TbFeCo, and DyFeCo.

3. A magneto-optical recording medium comprising recording means for recording information and a substrate for supporting said recording means, wherein said recording means includes:
- a recording magnetic film for recording the information, said recording magnetic film being formed of a perpendicular magnetic anisotropy film;
- a readout magnetic film for optically reading out the information, said readout magnetic film being capable of being magnetically coupled with said recording magnetic film by an exchange-coupling force; and
- a controlling magnetic film, provided between said recording magnetic film and said readout magnetic film, for controlling the exchange-coupling force, and wherein said readout magnetic film has in-plane magnetic anisotropy at room temperature, and is a perpendicular magnetic anisotropy film when the temperature of said readout magnetic film is increased to a predetermined temperature by a readout light irradiation, said predetermined temperature being set to be higher than room temperature and lower than a Curie temperature of said readout magnetic film by adjusting a composition of said readout magnetic film, wherein said readout magnetic film is formed of a film having a compensation temperature which is equal to or higher than said predetermined temperature, said film being an in-plane magnetic anisotropy film at room temperature and a perpendicular magnetic anisotropy film at about the compensation temperature, said readout magnetic film having the composition of

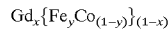

where $0.23 \leq x \leq 0.28$ and $0.5 \leq y \leq 0.75$, and wherein said controlling magnetic film has a compensation temperature which is approximately equal to said predetermined temperature and a Curie temperature which is set in the range from said predetermined temperature to a temperature lower than a temperature obtainable by irradiating a readout light upon said readout magnetic film, whereby the information recorded in said recording magnetic film is magnetically transferred to said readout magnetic film via a region having a temperature in the range of said predetermined temperature to the Curie temperature.

4. A magneto-optical recording medium according to claim 3, wherein said controlling magnetic film is formed of a material selected from the group consisting of TbFeCo, DyFeCo, and HoFeCo.

* * * * *